United States Patent
Zhu et al.

(10) Patent No.: US 10,078,889 B2
(45) Date of Patent: Sep. 18, 2018

(54) SYSTEM AND METHOD FOR IMAGE CALIBRATION

(71) Applicant: SHANGHAI UNITED IMAGING HEALTHCARE CO., LTD., Shanghai (CN)

(72) Inventors: Wentao Zhu, Houston, TX (US); Hongdi Li, Houston, TX (US); Mu Chen, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 0 days.

(21) Appl. No.: 15/225,901

(22) Filed: Aug. 2, 2016

(65) Prior Publication Data

US 2017/0061629 A1    Mar. 2, 2017

(30) Foreign Application Priority Data

Aug. 25, 2015  (CN) .......................... 2015 1 0528226
Jan. 25, 2016  (CN) .......................... 2016 1 0046405

(51) Int. Cl.
*G06K 9/00*       (2006.01)
*G06T 5/50*       (2006.01)
(Continued)

(52) U.S. Cl.
CPC ................. *G06T 5/50* (2013.01); *G06K 9/00* (2013.01); *G06T 5/007* (2013.01); *G06T 11/005* (2013.01);
(Continued)

(58) Field of Classification Search
CPC ......... A61B 8/42; A61B 8/4472; A61B 90/13; A61B 90/37; A61B 1/00193; A61B 1/043; A61B 2017/00207; A61B 2017/00216; A61B 2017/00973; A61B 2090/306; A61B 2090/309; A61B 2560/0487;
(Continued)

(56) References Cited

U.S. PATENT DOCUMENTS 7,382,853 B2    6/2008   Arenson et al.
7,502,440 B2    3/2009   Motomura et al.
(Continued)

FOREIGN PATENT DOCUMENTS

CN    102018523 A    4/2011
CN    103054605 A    4/2013
(Continued)

OTHER PUBLICATIONS

First Office Action in Chinese Application No. 201510528226.3 dated Jun. 27, 2017, 16 pages.
(Continued)

*Primary Examiner* — Aklilu Woldemariam
(74) *Attorney, Agent, or Firm* — Metis IP LLC

(57) ABSTRACT

The disclosure relates to a system and method for generating an image by the following steps: obtaining a first image and a second image relating to a subject; obtaining a third image of the subject by a radiology imaging technique; registering the first image and the second image to obtain a first element; calibrating the third image to obtain a second element based on the first element; calibrating the second image based on the second element.

15 Claims, 13 Drawing Sheets

(51) Int. Cl.
*G06T 11/00* (2006.01)
*G06T 5/00* (2006.01)

(52) U.S. Cl.
CPC .. *G06T 11/008* (2013.01); *G06T 2207/10081* (2013.01); *G06T 2207/10104* (2013.01); *G06T 2207/20021* (2013.01)

(58) Field of Classification Search
CPC . A61B 5/0071; A61B 2090/364; A61B 6/037; A61B 6/4441; A61B 6/463; A61B 6/5247; A61B 90/36; A61B 5/055; A61B 6/469; A61B 6/481; A61B 6/5223; A61B 6/583; A61B 8/14; A61B 8/4254; A61B 8/4416; A61B 6/4417; A61B 6/4458; A61B 8/08; A61B 8/085; A61B 8/4218; A61B 8/4245; A61B 8/4263; A61B 8/4444; A61B 8/483; A61B 8/5238; A61B 8/5261; A61B 90/39; A61B 5/112; A61B 6/5235; A61B 6/4241; A61B 6/032; A61B 2090/374; A61B 5/0035; A61B 6/482; A61B 1/0005; A61B 1/05; A61B 1/31; A61B 2034/2051; A61B 2034/2072; G06T 2211/424; G06T 2207/10081; G06T 11/006; G06T 2207/10104; G06T 2211/432; G06T 11/003; G06T 7/0012; G06T 2207/10016; G06T 2207/30004; G06T 2207/30242; G06T 3/40; G06T 7/30; G06T 2207/10; C12Q 1/6837; C12Q 2545/113; C12Q 2565/513; C12Q 1/6883; C12Q 2600/158; C12Q 2600/166; H04N 9/3185; H04N 17/004; H04N 5/23212; H04N 5/347; H04N 5/367; H04N 5/74; H04N 9/046; H04N 9/735; H04N 1/6033; H04N 1/6077; H04N 1/6086; G03F 1/36; G03F 7/70483; G03F 7/70625; G03F 7/70633; G03F 7/70641; G03F 7/70441; G03F 1/70; G06N 99/005; Y10T 428/24802; Y10S 977/734; G01R 33/4818; G01R 33/4824; G01R 33/5608; G01R 33/5611; G01R 33/5619; G01R 33/56308
USPC ........ 382/128, 129, 130, 131, 132; 600/410, 600/411, 413
See application file for complete search history.

(56) References Cited

U.S. PATENT DOCUMENTS

| | | | |
|---|---|---|---|
| 7,777,189 B2 | 8/2010 | Schweizer et al. | |
| 7,843,498 B2 | 11/2010 | Takahashi et al. | |
| 8,098,916 B2 | 1/2012 | Thielemans et al. | |
| 8,600,136 B2 | 12/2013 | Schweizer et al. | |
| 8,611,628 B2 | 12/2013 | Hu et al. | |
| 8,781,199 B2 | 7/2014 | Song et al. | |
| 8,879,814 B2 | 11/2014 | Wollenweber et al. | |
| 2003/0033097 A1* | 2/2003 | Tanaka | G01D 1/04 702/60 |
| 2004/0190676 A1* | 9/2004 | Kojima | G01N 23/046 378/19 |
| 2004/0215071 A1* | 10/2004 | Frank | A61B 6/4441 600/407 |
| 2005/0239104 A1* | 10/2005 | Ferea | C12Q 1/6837 435/6.14 |
| 2006/0151705 A1 | 7/2006 | Manjeshwar et al. | |
| 2008/0099686 A1 | 5/2008 | Defrise et al. | |
| 2009/0059263 A1* | 3/2009 | Hasegawa | H04N 1/6011 358/1.13 |
| 2009/0253980 A1 | 10/2009 | Wollenweber et al. | |
| 2009/0262996 A1 | 10/2009 | Samsonov et al. | |
| 2011/0060566 A1 | 3/2011 | Bertram et al. | |
| 2011/0103669 A1 | 5/2011 | Michel et al. | |
| 2011/0313279 A1* | 12/2011 | Subramanian | G01N 24/08 600/420 |
| 2012/0002857 A1 | 1/2012 | Song et al. | |
| 2012/0035462 A1* | 2/2012 | Maurer, Jr. | A61B 6/5247 600/411 |
| 2012/0050566 A1* | 3/2012 | Cote; Guy | H04N 5/23212 348/224.1 |
| 2012/0063658 A1* | 3/2012 | Leroux | G06T 11/006 382/131 |
| 2012/0123581 A1* | 5/2012 | Smilde | G03F 7/70483 700/105 |
| 2013/0236074 A1* | 9/2013 | Hillebrand | A45D 44/005 382/128 |
| 2013/0294671 A1 | 11/2013 | Iida et al. | |
| 2015/0030229 A1* | 1/2015 | Borsdorf | A61B 6/12 382/132 |
| 2015/0038829 A1 | 2/2015 | Natsuaki et al. | |
| 2015/0077573 A1* | 3/2015 | Ishikawa | G06T 3/005 348/189 |
| 2015/0221104 A1 | 8/2015 | Ra et al. | |
| 2015/0228093 A1* | 8/2015 | Miyasa | G06T 11/60 382/131 |
| 2016/0302747 A1* | 10/2016 | Averbuch | G06T 19/006 |
| 2017/0046857 A1 | 2/2017 | Ye et al. | |
| 2017/0276755 A1* | 9/2017 | Hoge | G01R 33/56554 |
| 2018/0008220 A1* | 1/2018 | Boone | A61B 6/4417 |

FOREIGN PATENT DOCUMENTS

| | | |
|---|---|---|
| CN | 103908278 A | 7/2014 |
| CN | 104700438 A | 6/2015 |
| CN | 105078495 A | 11/2015 |
| CN | 105147312 A | 12/2015 |

OTHER PUBLICATIONS

International Search Report for PCT/CN2016/096356 dated Nov. 25, 2016, 5 pages.

Written Opinion for PCT/CN2016/096356 dated Nov. 25, 2016, 5 pages.

H O. Zhu et al., Maximum Likelihood Algorithm for PET Image Reconstruction Based on Fuzzy Random Variable, Proceedings of the 26th Annual International Conference of the IEEE EMBS San Francisco, CA, IEEE Service Center; Piscataway, NJ, 3, 1361-1364 (2004).

Partial Search Report in European application No. 16815527.3 dated Jul. 23, 2018, 13 pages.

* cited by examiner

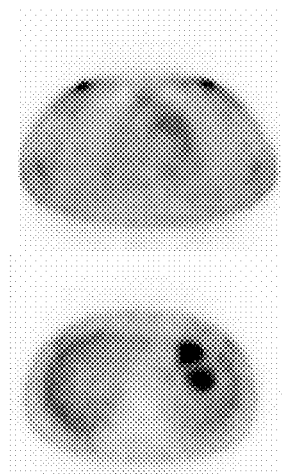
FIG. 13A
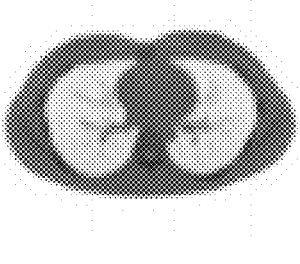
FIG. 13B
FIG. 13C
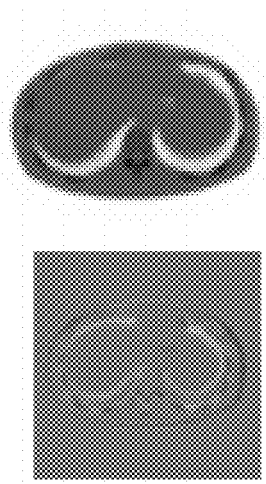
FIG. 13D
FIG. 13E
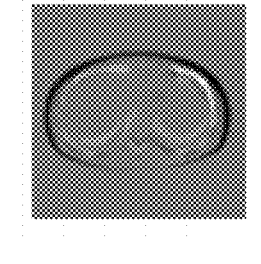
FIG. 13F

SYSTEM AND METHOD FOR IMAGE CALIBRATION

CROSS-REFERENCE TO RELATED APPLICATIONS

This application claims priority of Chinese Patent Application No. 201510528226.3 filed on Aug. 25, 2015, and Chinese Patent Application No. 201610046405.8 filed on Jan. 25, 2016, the contents of each of which are hereby incorporated by reference.

TECHNICAL FIELD

The present disclosure relates to an imaging processing, and more particularly, relates to a system and method for image calibration.

BACKGROUND

With the rapid developments of radiation-based imaging technologies including, for example, computed tomography (CT), positron emission tomography (PET), magnetic resonance imaging (MRI), and the expansion of their new clinical and industrial applications, the accuracy of the diagnosis may pose a challenge.

In one respect, a CT image and/or an MRI image may be combined with a PET image to provide a relatively thorough information of the tested subject. Also, in another respect, methods and apparatus may be provided to compare results of two or more medical image scans acquired at different time points, which may enable an accurate analysis of the changes in, for example, a lesion area. Such methods and apparatus may facilitate the interpretation of the images, and increase the accuracy of the diagnosis.

SUMMARY

One aspect of the present disclosure relates to a method for image calibration. The method may include one or more of the following operations. A first image based on first data relating to a subject may be obtained. A second image based on second data relating to the subject may be obtained. A third image of the subject relating to a radiology imaging technique may also be obtained. The first image and the second image may be registered to obtain a first element relating to the first image and the second image. The third image may be calibrated based on the first element to obtain a second element. The second image may be corrected based on the second element to generate a corrected second image.

According to some embodiments of the present disclosure, a plurality of images relating to the subject may be obtained. The first image and the plurality of images may be registered to obtain a plurality of first elements. The third image may be calibrated based on the plurality of the first elements to obtain a plurality of second elements. The plurality of images may be corrected based on the plurality of the second elements to generate a plurality of corrected images. In some embodiments, the plurality of images may include two to ten images. In some embodiments, a region of interest may be identified in a scanning area of the subject. A quantitative analysis may be further performed on the region of interest, the results of which may be sequentially displayed on a screen.

According to some embodiments of the present disclosure, the first element may be a motion field relating to the first image and the second image. The second element may include a CT image, an attenuation correction coefficient, or a scatter correction coefficient. In some embodiments, the first image may include a PET image corrected for attenuation correction based on the third image. In other embodiments, the first image may include a PET image without being corrected for attenuation correction. The registration relating to the first image and the second image may be performed by applying an optical flow method for mutual information maximization. The generation of the first image and the second image may be based on scans of the subjects performed at different time. The method may further include performing forward projection on the third image to obtain a third sinogram, based on which a contour filter may be determined. The contour filter may be able to filter the first image to generate filtered first data. And the first image may be reconstructed based on the filtered first data. The first image or the second image may include a PET image. The third image may include a CT image. In some embodiments, the third image may be derived from a correlation dictionary, which may include correlations between a plurality of MR images and a plurality of CT images. The CT image may be obtained by a sparse solution of the MR image of the subject and a correlation corresponding to the MR image of the subject. Alternatively, the CT image may be obtained by combining CT sub-images. One of the CT sub-images may be obtained by a sparse of an MR sub-image and a correlation corresponding to the MR sub-image. The method may further include generating an attenuation image based on the corrected second image. In some embodiments, the first image may be generated by combining a plurality of first sub-images. The plurality of the first sub-images may be generated from a plurality of sub-scans on the subject.

One aspect of the present disclosure relates to a method for image calibration. The method may include one or more of the following operations. A first image based on first data relating to a subject may be obtained. A third image of the subject may be obtained. A plurality of iterations may be conducted. During each of the iterations, the following operations may be performed. A second image relating to the subject from a prior iteration may be obtained. The second image and the first image may be registered to obtain a first element. The third image may be calibrated based on the first element to obtain an attenuation correction coefficient. A scatter correction coefficient may be obtained based on the attenuation correction coefficient, and an updated second image may be generated by correcting the second image based on the scatter correction coefficient. A corrected second image may be reconstructed based on the scatter correction coefficient and the attenuation correction coefficient obtained in the last iteration of the plurality of iterations.

One aspect of the present disclosure relates to a system for image calibration. The system may include a data processing module and an image processing module. In some embodiment, the data processing module may be configured to obtain a first image based on first data relating to the subject, a second image based on second data relating to the subject, and a third image of the subject. The image processing module may be configured to register the first image and the second image to obtain the first element relating to the first image and the second image, calibrate the third image based on the first element to obtain the second element, and correct the second image based on the second element to generate the corrected second image. The image processing module may be further configured to generate an attenuation correction coefficient based on the registration of the first image and the second image, and reconstruct the second image based on the attenuation correction and the second element. The system may further include a calculation unit configured to perform forward projection on the third image to obtain a third sinogram, a filter configured to determine a contour filter based on the third sinogram and filter the first image based on the contour filter to obtain filtered first data, and an image generator configured to reconstruct the first image based on the filtered first data. In some embodiments, the system may include an image generator to generate the first image by combining a plurality of sub-images. The plurality of sub-images may be generated by performing a plurality of sub-scans on the subject.

One aspect of the present disclosure relates to a system for image calibration. The system may include a data processing module and an image processing module. The data processing module may be configured to obtain a first image based on first data relating to the subject, and a third image of the subject. The image processing module may be configured to conduct a plurality of iterations. During each of the iterations, the following operations may be performed. A plurality of second images relating to the subject from a prior iteration may be obtained. The plurality of second images and the first image may be registered to obtain a plurality of first elements. The third image may be calibrated based on the plurality of first elements to obtain a plurality of attenuation correction coefficients. A plurality of scatter correction coefficients may be obtained based on the plurality of attenuation correction coefficients, and a plurality of updated second images may be generated by correcting the plurality of second images based on the plurality of scatter correction coefficients. A plurality of corrected second images may be reconstructed based on the plurality of scatter correction coefficients and the plurality of attenuation correction coefficients obtained in the last iteration of the plurality of iterations. In some embodiments, one of the plurality of first elements may be a motion field relating to the first image and one of the plurality of second images. The first image or the plurality of second images may include a PET image. The third image may include a CT image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 13A illustrates a PET image reconstructed from data acquired at a first time point, without attenuation correction, according to some embodiments of the present disclosure;

FIG. 13B illustrates a PET image reconstructed from data acquired at a second time point, without attenuation correction, according to some embodiments of the present disclosure;

FIG. 13C illustrates an attenuation image based on data acquired at the first time point according to some embodiments of the present disclosure;

FIG. 13D illustrates an estimated attenuation image corresponding to the second time point acquired by the methods described according to some embodiments of the present disclosure;

FIG. 13E illustrates a differential image between the estimated attenuation image and an actual attenuation image from data acquired at the second time point, according to some embodiments of the present disclosure; and FIG. 13F illustrates a differential image between another estimated attenuation image according to a traditional method and the actual attenuation image, according to some embodiments of the present disclosure.

DETAILED DESCRIPTION

In the following detailed description, numerous specific details are set forth by way of example in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

It will be understood that when a unit, engine, module or block is referred to as being "on," "connected to" or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof. It will be further understood that the terms "constructed" and "reconstruct", when used in this disclosure, may represent a similar process that an image may be transformed from data.

Figure 1:
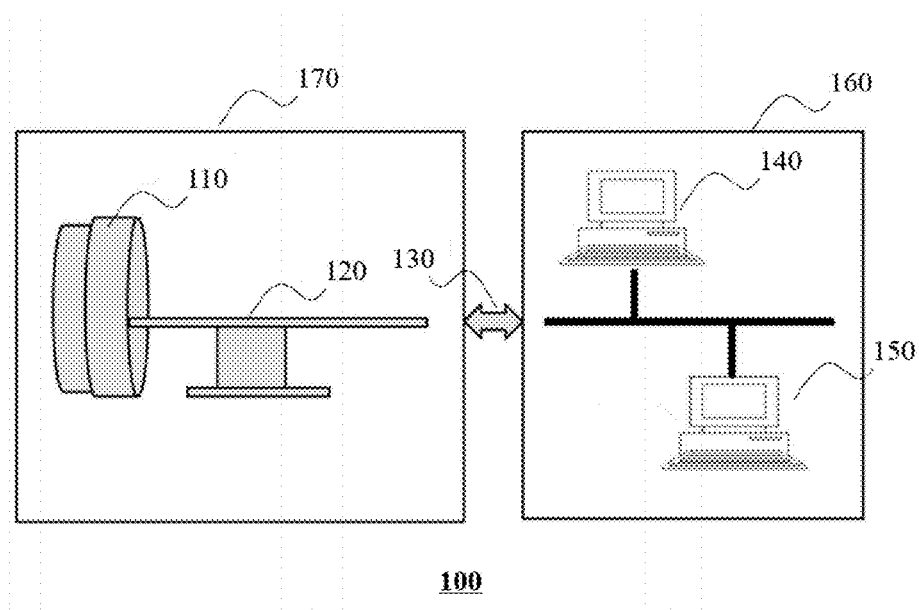
FIG. 1 illustrates an exemplary imaging system 100 according to some embodiments of the present disclosure.

FIG. 1 illustrates an exemplary imaging system 100 according to some embodiments of the present disclosure. As illustrated in FIG. 1, the imaging system 100 may comprise a scanning machine 170 and an image processing machine 160. The scanning machine 170 may include a scanning gantry 110 and a couch 120. The image generation machine 160 may include an operation console 140 and an input-output interface 150. The image generation machine 160 and the scanning machine 170 may be interconnected via a wired or wireless link 130.

In some embodiments, the scanning gantry 110 of the scanning machine 170 may be configured to scan a subject to be tested, and collect the projection information related thereto. For example, the scanning gantry 110 may detect radiation (e.g., X-ray) passing through the subject in the case of a computed tomography (CT) system. As another example, the scanning gantry 110 may detect photons in a positron emission tomography (PET) system, or a single photon emission computed tomography (SPECT) system. As another example, the scanning gantry 100 may detect radio frequency (RF) pulses in a magnetic resonance (MR) system. As still another example, the scanning gantry 110 may detect multiple signals in a multi-modality system. As used herein, the multi-modality system may represent a combination of different imaging systems as described above. The operation of the scanning gantry 110 may be executed under the control of the operation console 140.

The couch 120 may be configured to hold the subject and transport the subject into the bore of the scanning gantry 110. In some embodiments, the couch 120 may be adjusted along the horizontal direction according to an organized time sequence to obtain scanning data of different sections of the subject. In some embodiments, the couch 120 may be adjusted along the vertical direction manually or automatically.

The operation console 140 may be configured to control the scanning gantry 110 and the couch 120, and may regulate an image reconstruction process based on data collected through the scanning gantry 110 or other components in the scanning 170 (e.g., another scanning gantry not shown in FIG. 1). Take the multi-modality system into account, the operation console may process data corresponding to different modalities (e.g., a CT system, a PET system) in a combined manner. For example, the data corresponding to one modality may be used to calibrate the data corresponding to another modality. In some embodiments, the operation console 140 may be configured to execute a command input by an operator to adjust to the operation of the scanning machine 170.

The input-output interface 150 may be configured to receive data from an operator and display information relating to an operation status to the operator. Merely by way of example, the input-output interface 150 may display a reconstructed image. In some embodiments, the input-output interface 150 may transmit the received information to the operation console 140.

The data collected by the scanning machine 170 may be transmitted to the image generation machine 160 through the link 130. In some embodiments, the link 130 may take the form of a data line for communicating data. In some embodiments, the link 130 may take the form of a telecommunications network, a local area network (LAN), a wireless network, a wide area network (WAN) such as the Internet, a peer-to-peer network, a cable network, etc. The network may further connect to a remote server, a cloud server, a specific database, or the like, for accessing data relating to the image reconstruction process. Similarly, the image generation machine 160 may send a command to the scanning machine 170 through the link 130.

Figure 2:
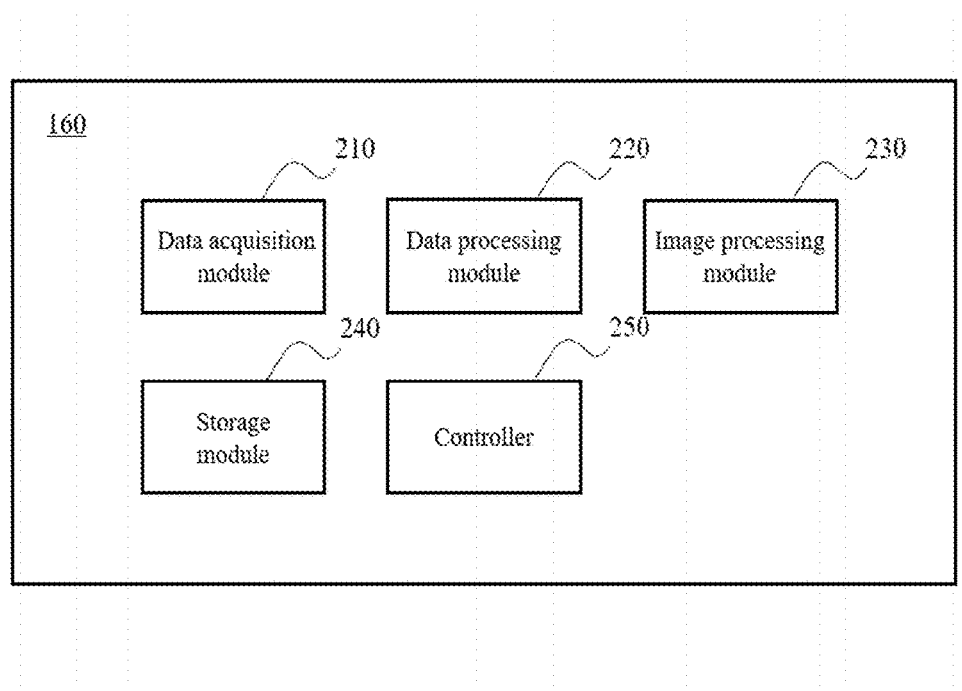
FIG. 2 illustrates a block diagram of the image generation machine 160 according to some embodiments of the present disclosure.

FIG. 2 is a block diagram of the image generation machine 160 according to some embodiments of the present disclosure. As shown in FIG. 2, the image generation machine 160 may include a data acquisition module 210, a data processing module 220, an image processing module 230, a storage module 240, and a controller 250. The different modules may be connected with each other directly, or through an intermediate medium (not shown). In some embodiments, the intermediate medium may be a visible component or an invisible field (radio, optical, sonic, electromagnetic induction, etc.). The connection between different modules may be wired or wireless. The wired connection may include using a metal cable, an optical cable, a hybrid cable, an interface, or the like, or a combination thereof. The wireless connection may include using a Local Area Network (LAN), a Wide Area Network (WAN), a Bluetooth, a ZigBee, a Near Field Communication (NFC), or the like, or a combination thereof. It should be noted that the above description about the imaging system is merely an example, should not be understood as the only embodiment. Obviously, to those skilled in the art, after understanding the basic principles of the connection between different modules, the modules and connection between the modules may be modified or varied without departing from the principles. The modifications and variations are still within the scope of the current disclosure described above. In some embodiments, these modules may be independent, and in some embodiments, part of the modules may be integrated into one module to work together.

The data acquisition module 210 may acquire imaging data from the scanning machine 170, and transmit the imaging data to the data processing module 220. In some embodiments, the data acquired by the data acquisition module 210 may be stored in the storage module 240. The data acquisition module 210 may acquire data under control of the controller 250. Merely by way of example, the controller 250 may control the time when the data acquisition module 210 may acquire data. As another example, the controller 250 may determine the data type (e.g. CT data, PET data, MR data, etc.) corresponding to different modalities that the data acquisition module 210 may acquire.

The data processing module 220 may process the imaging data relating to the subject being tested. In some embodiments, the filtering process may be performed on a set of PET data based on, for example, CT data and/or MR data. Details regarding the data processing module 220 may be found in FIG. 10.

The image processing module 230 may reconstruct an image based on the data transmitted from other modules. In some embodiments, the image processing module 230 may reconstruct an image (e.g., a PET image, a CT image) directly based on the data acquired by the data acquisition module 310. In some embodiments, the image processing module 230 may iteratively reconstruct an image based on intermediate data generated by, for example, the image processing module 230. Merely by way of example, based on the acquired data, the image processing module 230 may generate multiple images, among which one image may be used to calibrate another image. The calibrated image may be further processed to generate a final image.

The storage module 240 may be configured to store information transmitted by or processed by the data acquisition module 210, the data processing module 220, the image processing module 230, or the like, or a combination thereof. The information may include programs, software, algorithms, data, text, number, images, voice, or the like, or a combination thereof. For example, a program for initiating a scan by inputting some initial parameters or conditions may be stored in the storage module 240. Exemplary parameters or conditions may include the scanning time, the location of the subject for scanning, the rotating speed of the gantry, the sections of the subject for scanning, or the like, or a combination thereof. As another example, some information may be imported from an external resource, such as a floppy disk, a hard disk, a wireless terminal, or the like, or a combination thereof.

The controller 250 may be configured to control the scanning machine 170, and other modules in the image generation machine 160. In some embodiments, the controller 250 may transmit commands to the image processing module 230, the data processing module 220, the data acquisition module 210, etc. Exemplary commands may include the data type to be acquired and processed, the part of the image to be reconstructed, the iterative times, the algorithms occupied in the reconstruction, or the like, or a combination thereof. In some embodiments, the transmitted commands may be stored in the storage module 240, or an external storage to adjust some parameters, such as, the size of an image, the portion of a subject where image is to be displayed, or the duration that an image remains on a display screen.

Figure 3:
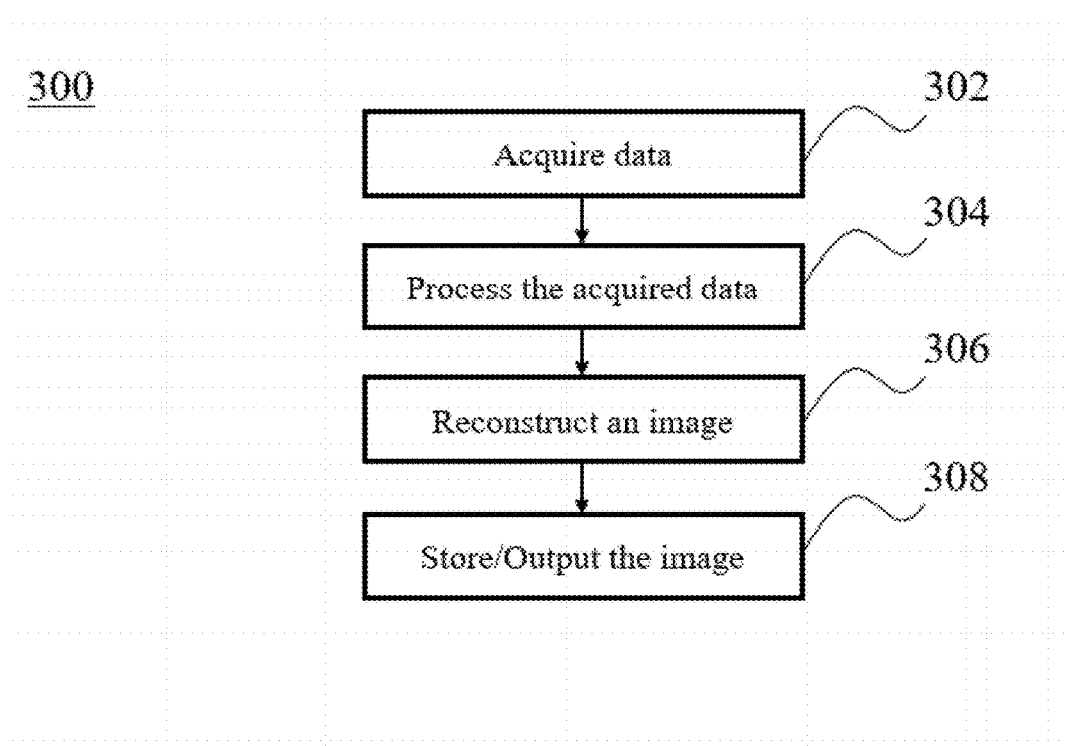
FIG. 3 illustrates a flowchart illustrating an image generation method according to some embodiments of the present disclosure.

FIG. 3 illustrates a flowchart illustrating an image generation method according to some embodiments of the present disclosure.

In step 302, data relating to a subject may be acquired. In some embodiments, the subject may include a substance, a tissue, an organ, a specimen, a body, or the like, or a combination thereof. In some embodiments, the subject may include a head, a breast, a lung, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof.

In some embodiments, the data relating to the subject may be acquired by performing a scan through a region of interest of a subject. In some embodiments, a number of protocols may be referred for scanning different objects. Multiple parameters may be determined by the protocols. Merely by way of example, the parameters may include collimator aperture, detector aperture, X-ray tube voltage and/or current, scan mode, table index speed, gantry speed, reconstruction FOV, or the like, or any combination thereof.

In step 304, the data acquired in step 302 may be processed. In some embodiments, the data may be pretreated before subsequent processes. In some embodiments, the data may be filtered in order to accelerate the subsequent processing or acquire a better reconstructed image. For example, In a PET-CT system, before reconstructing a PET image, the PET data may be filtered based on the CT data.

In step 306, an image may be reconstructed based on the data processed in step 304 by the image processing module 230. In some embodiments, during the reconstruction, an image corresponding to one modality may be reconstructed to calibrate an image corresponding to another modality. Specifically, a PET image may be calibrated based on a CT image. In some embodiments, the reconstruction of an image may base on methods including Fourier slice theorem, filtered back projection algorithm, iterative reconstruction, etc.

The image reconstructed in step 306 may be stored or output in step 308. The output image may undergo further process, such as noise reduction, contrast enhancement, etc., which may not be discussed in details herein.

It should be noted that the flowchart described above is provided for the purposes of illustration, and not intended to limit the scope of the present disclosure. For persons having ordinary skills in the art, various variations and modifications may be conducted under the teaching of the present disclosure. However, those variations and modifications may not depart from the protecting of the present disclosure. For example, the step 304 may not be necessarily performed to reconstruct an image. As another example, the step 304 and the step 306 may be processed in an iterative manner such that imaging data transformed from a reconstructed image may be filtered for a subsequent reconstruction.

Figure 4:
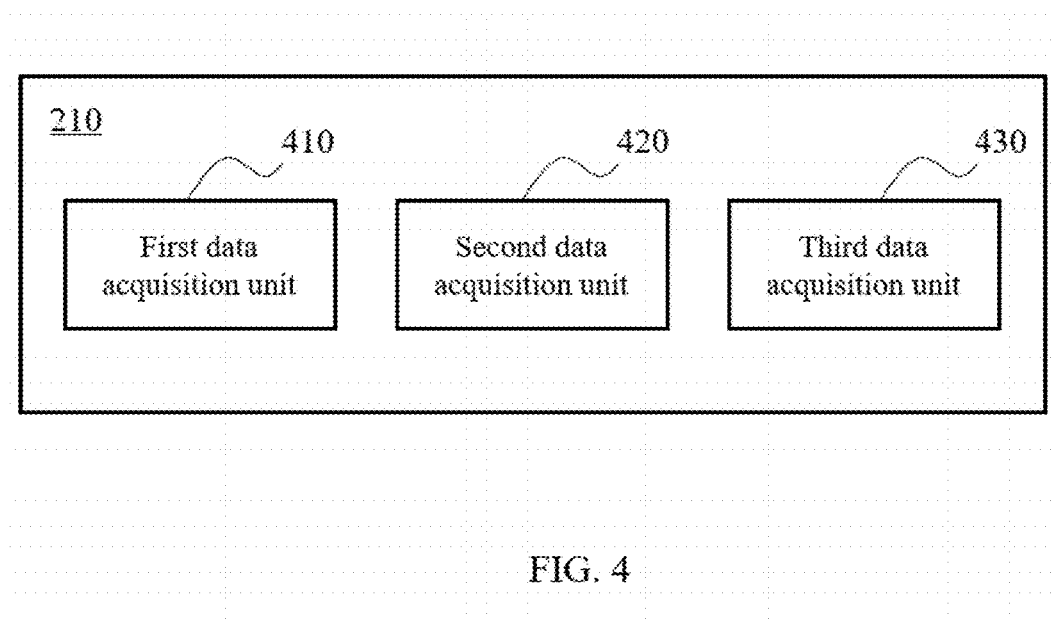
FIG. 4 illustrates an exemplary block diagram of a data acquisition module according to some embodiments of the present disclosure.

FIG. 4 illustrates an exemplary block diagram of a data acquisition module according to some embodiments of the present disclosure. As illustrated in FIG. 4, the data acquisition module 210 may include a first data acquisition unit 410, a second data acquisition unit 420, and a third data acquisition unit 430. In some embodiments, the first data acquisition unit 410, the second data acquisition unit 420, and the third data acquisition unit 430 may be configured to acquire different types of data corresponding to different imaging modalities. For example, the acquired data may include CT data, MR data, and/or PET data from the scanning machine 170. In some embodiments, the first data acquisition unit 410 and/or the third data acquisition unit 430 may be configured to acquire PET-CT data from the scanning machine 170. Further, the first data acquisition unit, the second data acquisition unit 420, and the third data acquisition unit 430 may operate separately or in a coordinated manner. Merely by way of example, only the first data acquisition unit 410 and the third data acquisition unit 430 may work, when a subject may only be scanned for CT data and PET data. Likewise, only the second data acquisition unit 420 and the third data acquisition unit 430 may work, when a subject may only be scanned for MR data and PET data. Further, the first data acquisition unit 410, the second data acquisition unit 420, and the third data acquisition unit 430 may operate concurrently or non-concurrently. In some embodiments, the first data acquisition unit 410 and the second data acquisition unit 420 may acquire a set of CT data and MR data at a same time point, while the first data acquisition unit 430 may still acquire another set of PET data at another time point.

Figure 5:
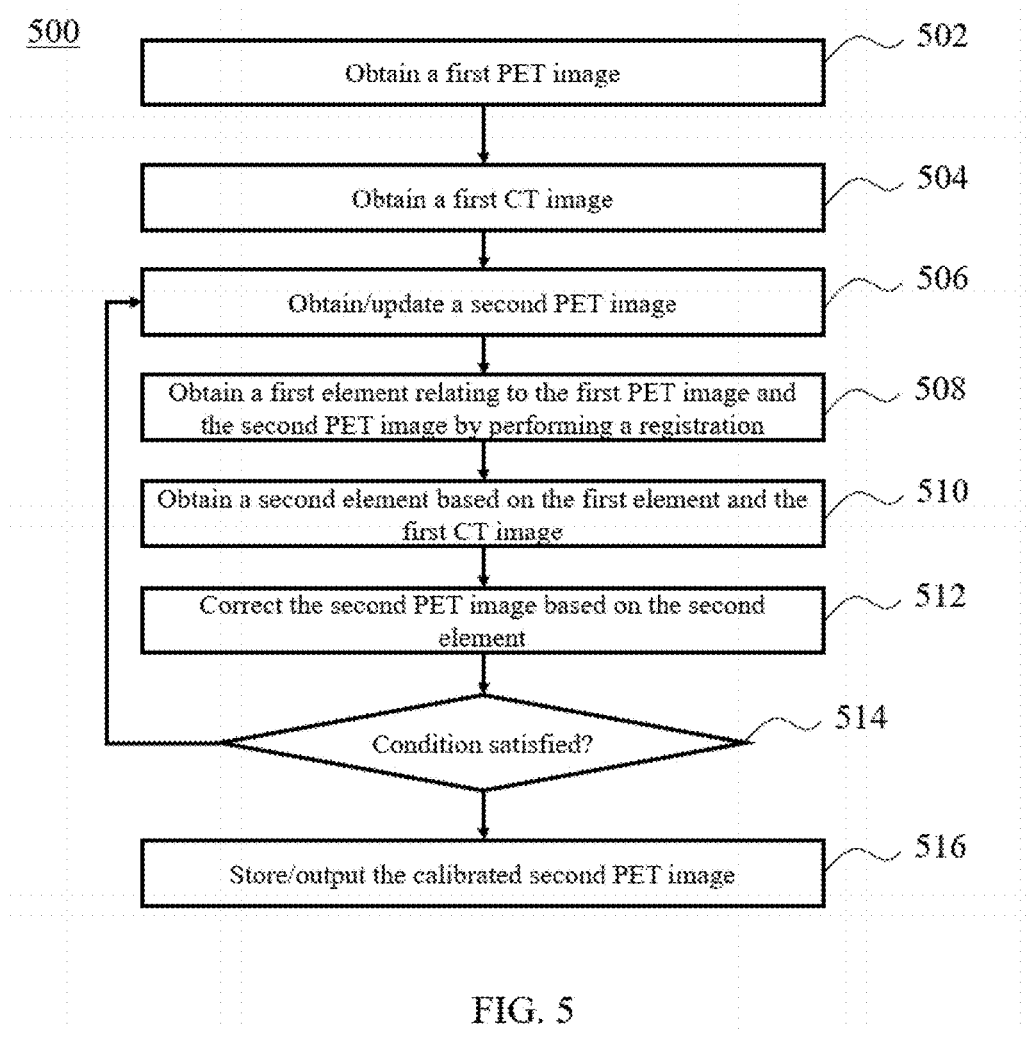
FIG. 5 illustrates a flowchart illustrating a process for generating a PET image according to some embodiments of the present disclosure.

FIG. 5 is a flowchart illustrating a process for generating a PET image according to some embodiments of the present disclosure. In step 502, a first PET image of a scanned subject may be obtained. In some embodiments, the image may be generated by performing a PET scan on a subject. For example, first PET data may be obtained by a PET scan, and the first PET image may be reconstructed based on the first PET data. In some embodiments, the first PET image may be obtained from an external resource, such as a floppy disk, a hard disk, a terminal via a wired connection or a wireless connection, or the like, or a combination thereof. In some embodiments, an attenuation correction may be performed on the first PET data before it being reconstructed to the first PET image. In some embodiments, the first PET image may be obtained via attenuation correction based on a CT image. The CT image used to conduct attenuation correction on the first PET data or the first PET image may be found in step 504. In some embodiments, the attenuation correction of the PET image may be a process of enhancing the image quality at a section of an image with a low image quality. The process may compensate the energy level decay in the photons detected in the PET scan. In some embodiments, the PET scan may be implemented by the system 100. In some embodiments, the image may be obtained from a storage medium (e.g., the storage module 240). In some embodiments, the image may be obtained from an external resource. In some embodiments, the external resource may be connected to the system of the present disclosure through the link 130 either via a wired connection or wirelessly and provide the PET image as needed.

A first CT image of the subject may be obtained in step 504. In some embodiments, the first CT image may be obtained by performing a radiological scan of the subject. In some embodiments, the radiological scan may be a magnetic resonance imaging (MRI) scan or a computed tomography (CT) scan. Merely by way of example, the first CT image may be generated based on an MR image by transforming the MR image into a CT image. In some embodiments, the CT image and the first PET image may be obtained by performing two scans concurrently. Merely by way of example, the CT image and the first PET image may represent essentially the same scanning area of the scanned subject. As used herein, "essentially," as in "essentially the same," etc., with respect to a parameter or a feature may indicate that the variation is within 2%, or 5%, or 8%, or 10%, or 15% of the parameter or the feature, or an average value of the parameter. Specifically, the CT image and the first PET image may be generated by performing a PET-CT scan in, for example, the system 100. In some embodiments, the first CT image may be obtained from an external resource.

In some embodiments, the first CT image may be obtained by at least some of the following steps. A database of CT image templates may be constructed or otherwise provided. The CT image templates may be CT images of a plurality of tissues and organs under different scanning conditions including, e.g., scanning areas and angles. An appropriate image template may be selected from the CT image template database based on one or more criteria including, for example, scanning area, angle, or the like, or a combination thereof. Image registration may be performed between the selected image template and the first PET image obtained in step 502 to generate a first CT image. In some embodiments, the registration may determine the relative displacement of pixels between two images and may determine the correlation in size, shape, and/or position of an identified tissue or organ based on the displacement of pixels in one image relative to the other. The image registration may be conducted by the image processing module 230.

In step 506, a second PET image may be obtained. In some embodiments, the scanning area of the second PET scan may be the same as the scanning area of the first PET scan. In some embodiments, the second PET image may be based on a scan of the subject performed at a different time point with respect to that of the first PET image. In some embodiments, second PET data may be obtained by a second PET scan. The second PET data may be further reconstructed to provide the second PET image. In some embodiments, a plurality of PET images (e.g. Img3, Img4, . . . , ImgN) may be obtained in step 506 by performing a plurality of scans on the subject. The scanning area of the plurality of PET scans (e.g. Img3, Img4, . . . , ImgN) may be essentially the same as the scanning area of the first PET scan. Further, the plurality of PET scans may be performed at different time points. In some embodiments, the second PET image may be obtained according to maximum likelihood expectation maximization (MLEM) or maximum likelihood estimation of attenuation and activity (MLAA), based on second PET data. In some embodiments, the second PET image may be acquired by ordered subset expectation maximization (OSEM). Merely by way of example, a PET image and an attenuation image may be iteratively updated in sub-iterations of the OSEM. In some embodiments, in a sub-iteration based on a subset of emission data, a PET image and an attenuation image may be updated according to, for example, formulas (12) to (15). As used herein, a PET image may be iteratively reconstructed based on different subsets of emission data, among which one sub-iteration may include reconstructing the PET image based on a subset of the emission data according to, for example, OSEM. In some embodiments, an attenuation image may be initialized, and during a sub-iteration, the PET image and the attenuation image may be updated sequentially. The sequential update may be performed by way of updating the PET image based on formula (13) while keeping the attenuation image unchanged and updating the attenuation image based on formula (15). In some embodiments, the initialization of the attenuation image may base on the estimation of the second PET data. In some embodiments, the initialization of the attenuation image may be set by default or by a user. In some embodiments, the initialization of the attenuation image may be performed by the image processing module 230.

After the second PET image is obtained, a registration may be performed between the first PET image and the second PET image to obtain a first element in step 508. In some embodiments, the first element may be a motion field between the first PET image and the second PET image. In some embodiments, the motion field may be obtained by an optical flow method. In some embodiments, the motion field may be used to calibrate the first PET image to generate a motion-filed calibrated PET image. The motion-field calibrated PET image may correspond to a calibrated second PET image which in turn corresponds to the second PET image acquired by scanning in step 506. An exemplary motion-filed calibrated PET image that may be calibrated from the first PET image is illustrated in FIG. 12F. In some embodiments, the registration may determine the relative displacements of pixels between two images in order to determine the change in size, shape, and/or position of an identified section (e.g., a tissue, an organ, etc.) based on the relative displacements of the pixels. In some embodiments, the registration may be performed by a registration algorithm, based on, for example, mutual information. In some further embodiments, conditioning that a plurality of PET images (e.g. Img3, Img4, . . . , ImgN) have been obtained in step 506, a plurality of the first elements may be obtained by registering the first PET image and the plurality of PET images. Merely by way of example, N may range from 2 to 10.

After obtaining the first element, a second element may be obtained based on the first element and the first CT image in step 510. In some embodiments, the second element may be obtained by performing a calibration of the first CT image based on the first element. In some embodiments, the second element may be a calibrated second CT image. In some embodiments, the second element may be an attenuation correction coefficient that may be used to correct the second PET image. In some embodiments, a plurality of first elements have been obtained in step 508, and a plurality of the second elements may be obtained based on the plurality of first elements and the first CT image in step 510.

In step 512, the second element may be used to correct the second PET image to generate a calibrated second PET image. In some embodiments, the second element may be used to perform an attenuation correction on the second PET image. In some embodiments, the second element may be used to perform an attenuation correction on the data corresponding to the second PET image. In some embodiments, a plurality of PET images have been obtained in step 506, a plurality of second elements have been obtained in step 510, and a plurality of corrected images may be generated by performing an attenuation correction on the plurality of PET images based on the plurality of the second elements. In some embodiments, a scatter correction may be performed on the second PET image Img2 to generated a scatter corrected second PET image based on, for example, a scatter correction coefficient. The scatter correction coefficient may be determined based on the attenuation correction coefficient and the first CT image.

After the second PET image is corrected, a judgment may be conducted with respect to a condition in step 514. If the condition is satisfied, the process 500 may proceed to store and/or output the corrected second PET image in step 516. If the condition is not satisfied, further iterations may be performed and the process 500 may proceed back to step 506, in which the second PET image may be updated. There may be different kinds of conditions to determine whether more iterations need to be performed. In some embodiments, the condition may relate to one or more parameters set in the system. For example, the condition may be that the difference between the reconstructed PET image from the current iteration and the previous iteration is below a certain threshold. In some embodiments, the condition may be that a certain number of iterations have been performed. In some embodiments, the second PET image in step 506 may be updated by the corrected second PET image from the previous iteration.

It shall be noticed that many alternatives, modifications, and variations will be apparent to those skilled in the art. The features, structures, methods, and other characteristics of the exemplary embodiments described herein may be combined in various ways to obtain additional and/or alternative exemplary embodiments. In one example, the sequence in the flowchart may be adjusted that the first CT image may be obtained prior to the first PET image. Furthermore, the first PET image may be reconstructed from the first PET data corrected by the first image.

Figure 6:
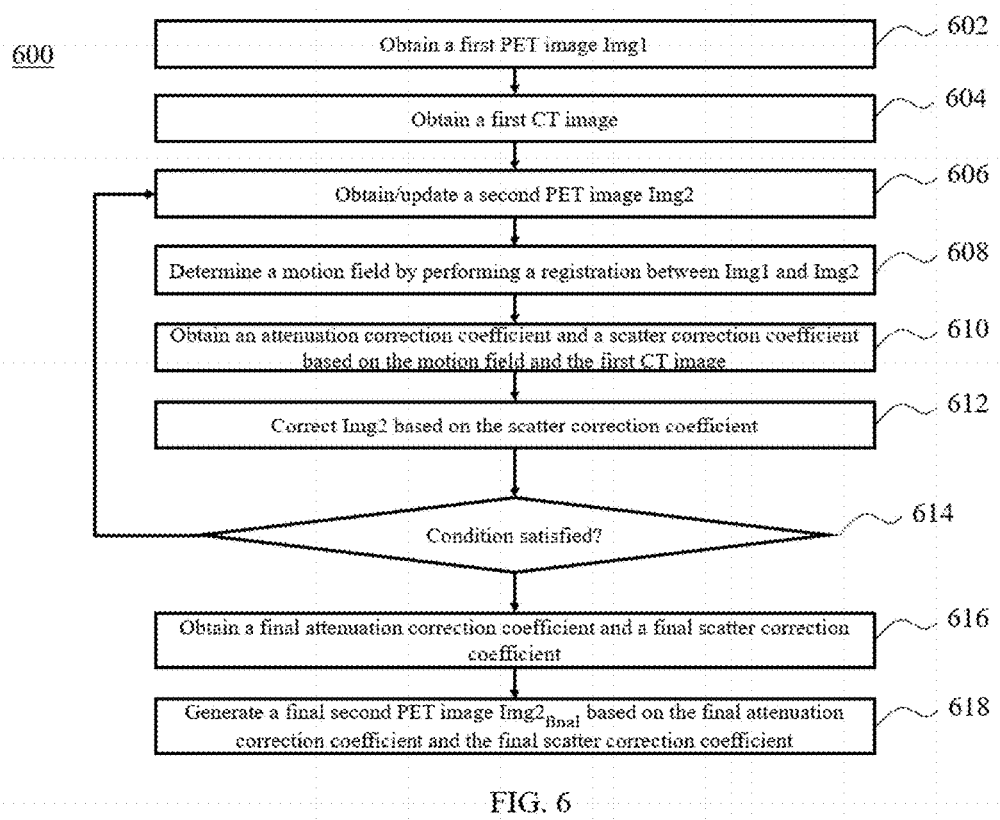
FIG. 6 is an exemplary flowchart illustrating a process for generating a calibrated PET image according to some embodiments of the present disclosure.

FIG. 6 is an exemplary flowchart illustrating a process for generating a corrected PET image according to some embodiments of the present disclosure. In step 602, a first PET image Img1 of a scanned subject may be obtained. The first PET image Img1 may be obtained by methods as described elsewhere in the disclosure. A first CT image of the scanned subject may be obtained in step 604.

In some embodiments, the CT image may be obtained by at least some of the following steps. A database of CT image templates may be constructed or otherwise provide. The CT image templates may be CT images of a plurality of tissues and organs under different scanning conditions including, e.g., scanning areas and angles. An appropriate image template may be selected from the CT image template database based on one or more criteria including, for example, scanning area, angle, or the like, or a combination thereof. Image registration may be performed between the selected image template and the first PET image Img1 obtained in step 602 to generate a first CT image. In some embodiments, the registration may determine the relative displacement of pixels between two images and may determine the correlation in size, shape, and/or position of an identified tissue or organ based on the displacement of the pixels in one image relative to the other. In some embodiments, the first CT image may be obtained from an external resource, such as a floppy disk, a hard disk, a wireless terminal, or the like, or a combination thereof.

In some embodiments, the first CT image and the first PET image Img1 may be obtained by performing two scans concurrently or sequentially. In some embodiments, the first CT image and the first PET image Img1 may be generated by performing a PET-CT scan. In some embodiments, the first PET image Img1 may be corrected by way of attenuation correction based on the first CT image.

In step 606, a second PET image Img2 of a scanned subject may be obtained. In some embodiments, the second PET image Img2 may be obtained at a time different from the time the first PET image Img1 is obtained.

After obtaining the first PET image Img1 and the second PET image Img2, a registration may be performed between Img1 and Img2 in step 608 to determine a motion field (also referred as a transformation field).

In some embodiments, the motion field may denote the displacement of a pixel in an image compared to the pixel in another image. For illustrative purposes, if the coordinate of a pixel in image A is (x, y, z), the motion field of the pixel is ($\Delta x$, $\Delta y$, $\Delta z$), and the image formed after applying the motion field on image A is image B, the corresponding pixels in image B and image A may be expressed as:

$$B(x+\Delta x, y+\Delta y, z+\Delta z) = A(x,y,z), \quad (1)$$

In some embodiments, the registration between the first PET image Img1 and the second PET image Img2 may be performed by a registration algorithm. In some embodiments, the registration algorithm may be based on mutual information.

In some embodiments, registration of two images may be performed as follows. An optimization function may be constructed. The optimization function may be directly proportional to the degree of similarity between the images to be registered. One of the two images may be iteratively updated with respect to the motion field by optimizing the cost function in a neighborhood in order to achieve a higher degree of similarity between the two images. In some embodiments, the optimization function of mutual information may be expressed as:

$$I(T(X), Y) = H(T(X)) + H(Y) - H(T(X), Y) \quad (2)$$
$$= \Sigma_{x \in T(X), y \in Y} p(x, y) \log \frac{p(x, y)}{p(x)p(y)},$$

where X and Y may denote two initial images, x and y may denote the intensity values of pixels in the images, T may denote a motion field that may be applied on the image X, I may denote an optimization function, H may denote an entropy, p(x, y) may denote the joint probability when the pixel in X has a value x and the pixel in Y has a value y, and p(x) and p(y) may denote the independent probability when the pixel in X is x and the pixel in Y is y, respectively.

In some embodiments, entropy H may be defined as:

$$H = -\Sigma_i p_i \log p_i, \quad (3)$$

where $p_i$ may denote the probability of the value of the ith the pixel.

In some embodiments, motion field T may be defined as:

$$T = \max_T I(T(A), B), \quad (4)$$

In some embodiments, the motion field between the first PET image Img1 and the second PET image Img2 may be obtained by an optical flow method. Specifically, the optical flow method may include obtaining a moving feature of a moving object at different time points to determine a change of the moving object in a PET image. In some embodiments, the PET image at different time points may be reconstructed and corrected based on the change of the moving object.

After obtaining the motion field by performing a registration between Img1 and Img2, an attenuation correction coefficient $U_2$ and a scatter correction coefficient $S_2$ may be obtained in step 610 based on the motion field and the first CT image. In some embodiments, the scatter correction coefficient $S_2$ may be determined based on the attenuation correction coefficient $U_2$ and a specific model. For instance, the model may be a single scatter simulation (SSS) model. In some embodiments, after obtaining the attenuation correction coefficient $U_2$, random events and scatter events may be calculated for the reconstruction of PET images. In some embodiments, the random events may be obtained by applying a delay time window and the scatter events may be calculated by initial chordal data and an attenuation image based on the SSS model. As used herein, an attenuation image may be represented in the form of an image illustrating the attenuation of a radiation ray by a subject. In some embodiments, scatter events may be predicted based on the attenuation image.

The SSS model may be expressed as:

$$S^{AB} = \int_{V_s} dV_s \left( \frac{\sigma_{AS} \sigma_{BS}}{4\pi R_{AS}^2 R_{BS}^2} \right) \frac{\mu}{\sigma_c} \frac{d\sigma_c}{d\omega} (I^A + I^B), \quad (5)$$

$$I^A = \varepsilon_{AS} \varepsilon'_{BS} e^{-\left(\int_S^A \mu ds + \int_S^B \mu' ds\right)} \int_S^A \rho ds, \quad (6)$$

and $$I^B = \varepsilon'_{AS} \varepsilon_{BS} e^{-\left(\int_S^A \mu' ds + \int_S^B \mu ds\right)} \int_S^B \rho ds, \quad (7)$$

where (A, B) may denote a detector pair, $S^{AB}$ may denote a count rate that a photon pair in a single scattering is detected by the detector pair, $V_s$ may denote the volume of the scatter, S may denote a scattering point, $\sigma_{AS}$ may denote a cross-section of AS line of response with respect to detector A, $\sigma_{AS}$ may denote a cross-section of BS line of response with respect to detector B, $R_{AS}$ may denote the distance between S and detector A, $R_{BS}$ may denote the distance between S and detector B, μ may denote an attenuation coefficient with respect to 511 KeV, μ' may denote attenuation of a photon after scattering, $\sigma_c$ may denote a cross-section of a Compton contact, ω may denote a scattering angle, $\varepsilon_{AS}$ may denote the detection efficiency of the detector A at 511 keV, $\varepsilon'_{AS}$ may denote the detection efficiency of the detector A at an energy level corresponding to a photon after scattering, $\varepsilon_{BS}$ may denote the detection efficiency of the detector B at 511 keV, $\varepsilon'_{BS}$ may denote the detection efficiency of the detector B at an energy level corresponding to a photon after scattering, and ρ may denote a radioactivity distribution.

After obtaining the attenuation correction coefficient $U_2$ and the scatter correction coefficient $S_2$, the second PET image Img2 may be corrected in step 612 based on the scatter correction coefficient $S_2$. In some embodiments, the Img2 may be reconstructed in an iterative manner. Merely by way of example, the reconstruction of Img2 may be performed according to maximum likelihood expectation maximization (MLEM), maximum likelihood estimation of attenuation and activity (MLAA), or the like, or any combination thereof.

In some embodiments, the ordered subset expectation maximization may be expressed as:

$$x_j^{n,m+1} = \frac{x_j^{n,m}}{\Sigma_i A_i P_{ik}} \Sigma_i A_i P_{ik} \frac{y_i}{A_i \Sigma_k P_{ik} x_k^{n,m} + r_i + s_i}, \quad (8)$$

where $x_j^{n,m}$ may denote an estimated value of the $j_{th}$ pixel in the reconstructed image after n times of iterations and m times of subset update, $\Sigma_i A_i P_{ik}$ may denote a normalization coefficient, $P_{ik}$ may denote a system response model, $y_i$ may denote acquired PET sinogram, $r_i$ may denote a correction term of random event, $s_i$ may denote scatter event, and $A_i$ may denote attenuation coefficient. $P_{ik}$, the system response model, may represent the probability that a pixel unit count in the kth image is detected by the $i_{th}$ line of response. The relationship between the attenuation coefficient $A_i$ and attenuation image μ may be expressed as:

$$A_i = e^{-\int \mu(x) dl}, \quad (9)$$

where μ(x) may denote the coefficient of the $x_{th}$ pixel in the generated attenuation image, and integration path 1 may move along the $i_{th}$ line of response (LOR).

In some embodiments, a method for obtaining a scatter correction estimate $s_i(S_2$ for the second PET image) may include: calculating $S^{AB}$; determining a ratio between $S^{AB}$ and a smearing of the acquired chordal data outside the scanned subject, and multiplying the ratio by $S^{AB}$ to generate an estimated scatter correction estimate $s_i$.

In some embodiments, the second PET image and/or a subsequent PET image may be reconstructed iteratively according to formula (10) based on the first PET image Img1.

$$x_j^{n,m+1} = \frac{x_j^{n,m}}{\Sigma_k P_{ik}} \Sigma_i P_{ik} \frac{y_i}{\Sigma_k P_{ik} x_k^{n,m} + r_i}, \quad (10)$$

where $y_i$ may denote the second PET image and/or a subsequently acquired PET chordal data.

The reconstruction of image may apply scatter correction, attenuation correction, or the combination thereof during an iteration process depending on different conditions. In some embodiments, lack of attenuation correction may result in a bright edge and a dark center in an image, and lack of scatter correction may result in a smearing artifact. In some embodiments, reconstructing the second PET image Img2 without attenuation correction nor scatter correction may lead to both the bright edge and the smearing artifact.

In some embodiments, the PET image may be reconstructed as:

$$x_j^{n,m+1} = \frac{x_j^{n,m}}{\Sigma_k P_{ik}} \Sigma_i P_{ik} \frac{y_i}{\Sigma_k P_{ik} x_k^{n,m} + r_i + s_i}, \quad (11)$$

where scatter correction may be applied without attenuation correction on the reconstructed PET image.

In some embodiments, in order to have similar image quality, the first PET image Img1 may also be constructed by formula (11).

After the second PET image Img2 is corrected, a judgment may be conducted with respect to a condition in step 614. If the condition is satisfied, the process may proceed to generate a final attenuation correction coefficient and a final scatter correction coefficient in step 616 based on the attenuation correction coefficient and the scatter correction coefficient obtained in the current iteration. If the condition is not satisfied, further iteration may be performed and the process may go back to step 606, in which the second PET image may be updated. There may be different kinds of conditions to determine whether more iterations need to be performed. In some embodiments, the condition may relate to one or more parameters set in the system, such as a number of iterations, a requirement on the image quality of the constructed Img2, the difference between the constructed Img2 in successive iterations, or the like, or any combination thereof. For example, the condition may be that the difference between the reconstructed PET image from the current iteration and the previous iteration is below a certain threshold. As another example, the condition may be that a certain number of iterations have been performed. In some embodiments, the update of the second PET image may be performed based on the second PET image obtained from the second PET scan and the reconstructed second PET image from the previous iterations.

A final PET image Img2$_{final}$ may be generated in step 618 based on the final attenuation correction coefficient and the final scatter correction coefficient. In some embodiments, the final second PET image may be reconstructed by an ordered subset expectation maximization.

This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. It should be appreciated for those skilled in the art that a plurality of PET images (e.g. Img3, Img4, ..., ImgN) may be obtained and corrected according to the method of the present disclosure. Furthermore, the plurality of PET images may be processed, such as displayed, based on the analysis on the PET images.

Figure 7:
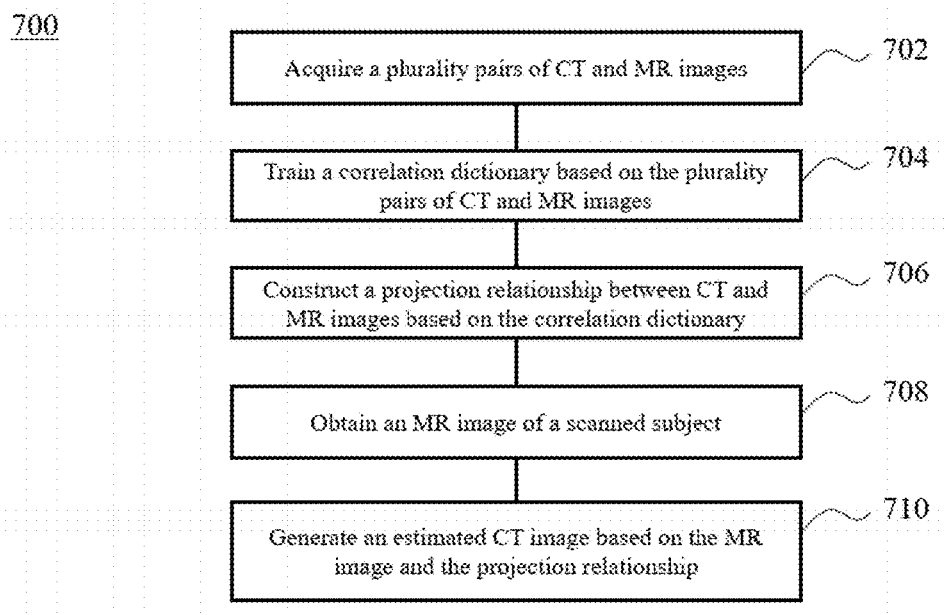
FIG. 7 is a flowchart illustrating a process for generating an estimated CT image of a scanned subject from a corresponding MR image according to some embodiments of the present disclosure.

As described elsewhere in the disclosure, a CT image used in the reconstruction of a PET image may be obtained from a CT scan, or another corresponding scan (e.g., an MR scan). Merely by way of example, the CT image generated may be the first CT image illustrated elsewhere in the present disclosure. Take MR scan as an example, FIG. 7 illustrates a method of generating an estimated CT image of a scanned subject from a corresponding MR image according to some embodiments of the present disclosure.

In step 702, a plurality pairs of CT and MR images may be acquired. In some embodiments, the pairs of images may be produced by performing a CT scan and an MR scan on a same subject. In some embodiments, the CT scan and the MR scan may be performed at essentially the same scanning area and/or essentially the same angle. In some embodiments, the pairs of images may be obtained by a CT-MR system to acquire the CT and MR images concurrently. In some embodiments, the plurality pairs of images may correspond to different subjects and/or different sections of the subjects. In some embodiments, the sections may include but not limit to a head, a breast, a lung, a trachea, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof.

After acquiring pairs of CT and MR images, a correlation dictionary may be trained in step 704. In some embodiments, the correlation dictionary may be trained by a support vector machine, a logistic regression, a back propagation neural network, an ordinary least square, a stepwise regression, self-organizing map, a k-means algorithm, an expectation maximization algorithm, or the like, or any combination thereof. In some embodiments, registrations (e.g., in geometry) may be performed between the CT images and the MR images. Merely by way of example, registrations between a CT image and an MR image may indicate the spatial difference (e.g., geometric difference) between the two images.

After being trained by a plurality of pairs of CT and MR images, (e.g., correlations are formed between CT images and MR images), a trained correlation dictionary may construct a projection relationship between a CT image and an MR image in step 706. In some embodiments, the correlation dictionary may generate estimated CT data in response to an MR image or MR data based on the projection relationship. Further, the estimated CT data may be reconstructed to provide an estimated CT image. In some embodiments, the correlation dictionary may generate an estimated MR image based on a CT image or CT data. In some embodiments, if an MR image and a CT image are both provided, an evaluating result may be generated based on the projection relationship. The evaluation result may relate to whether the two images are obtained from a same subject or essentially the same section of a subject. The correlation dictionary may be a knowledge graph, a neural network, a database, or the like, or any combination thereof.

In step 708, an MR image of a scanned subject may be obtained. In some embodiments, the MR image may be generated by a direct MR scan on a subject. For example, MR data may be obtained by an MR scan, and the MR image may be reconstructed based on the MR data. In some embodiments, the MR image may be obtained from a storage medium (e.g., the storage module 240). In some embodiments, the image may be obtained from an external resource. In some embodiments, the external resource may be connected to the system of the present disclosure through the link 130 either via a wired connection or wirelessly and provide the MR image as needed.

In step 710, an estimated CT image may be generated based on the MR image and the projection relationship. In some embodiments, by searching the correlation dictionary, a sparse solution corresponding to the provided MR image may be obtained. Merely by way of example, the sparse solution may be a vector or a matrix correlating the MR image with the correlation dictionary. Based on the sparse solution and the correlation dictionary, an estimated CT image may be generated in step 710. In some embodiments, the correlation dictionary may be provided by an external resource, such as a floppy disk, a hard disk, a wireless terminal, or the like, or a combination thereof. Merely by way of example, the estimated CT image may be the CT images used in the reconstruction of the PET images (e.g., the first PET image Img1, the second PET image Img2) illustrated elsewhere in the present disclosure. In some embodiments, step 708 may include generating a plurality of MR sub-images based on the provided MR image. In some embodiments, the plurality of MR sub-images may be extracted from the provided MR images. Merely by way of example, the generation of the MR sub-images may include grouping and/or identifying sections on the provided MR image with similar color or greyness. After the MR sub-images are generated, the sparse solutions to each sub-images may be obtained by searching the correlation dictionary. As a result, a plurality of corresponding estimated CT sub-images may be generated in step 710. Furthermore, the estimated CT sub-images may be combined to generate an estimated CT image corresponding to the provided MR image.

In some embodiments, a sliding window may be used to generate a plurality of MR sub-images from the provided MR image, at least some of which may at least partially overlap with each other. As a result, at least some of a plurality of CT sub-images corresponding to the plurality of MR image blocks may overlap with each other. In some embodiments, the plurality of CT sub-images may have different greyness/color for pixels in the overlapping sections. Furthermore, the pixels with different greyness/color may be averaged and the CT sub-images may be combined to generate an estimated CT image.

This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. It should be appreciated for those skilled in the art that the image generating process disclosed herein may be used in generating a plurality types of images from other types. Merely by way of example, the images used for training may include but not limit to a CT image, an MR image, a PET image, a SPECT image, an ultrasound image, a non-radiological image, a camera photo or the like, or any combination thereof.

Figure 8:
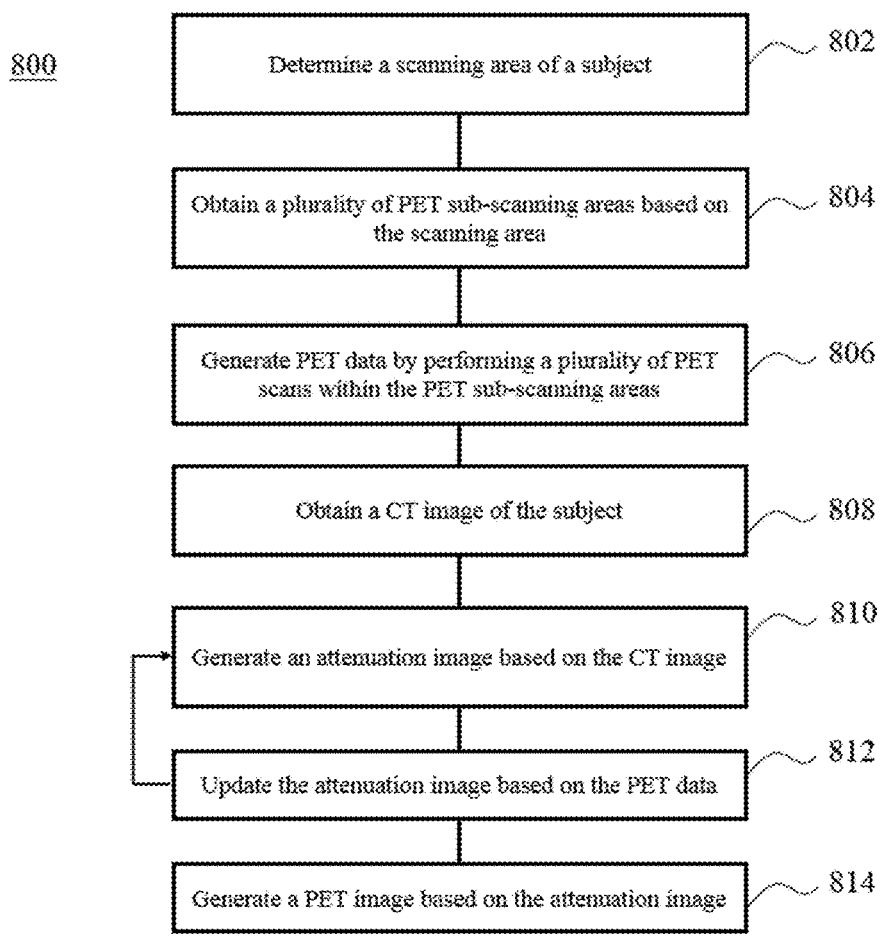
FIG. 8 is a flowchart illustrating a PET image generating process based on a plurality of PET scans according to some embodiments of the present disclosure.

FIG. 8 is a flowchart illustrating a PET image generating process based on a plurality of PET scans according to some embodiments of the present disclosure. In step 802, a scanning area of a subject may be determined. In some embodiments, the step 802 may include performing a preliminary scan to generate a preliminary image of the subject. The preliminary scan may be a radiological or a non-radiological scan. In some embodiments, the preliminary image may provide information about the location, the appearance, and the shape of the scanned subject. In some embodiments, the user may select and/or determine a scanning area of the PET scan in the preliminary image, or further select an area of interest in the selected scanning area. In some embodiments, the area of interest may correspond to an organ like heart, brain, or a tissue like muscle, skin, etc. In some embodiments, the determined scanning area may be in any regular or irregular shape.

After the scanning area and the area of interest are determined, a plurality of PET sub-scanning areas may be generated in step 804. In some embodiments, the sub-scanning areas may correspond to suitable positions of the PET detectors. In some embodiments, the sub-scanning areas, when combined, may cover the scanning area. In some embodiments, the sub-scanning areas may be combined to partly cover the scanning area. Merely by way of example, the sub-scanning areas may be combined to cover areas of interest of the subject. After obtaining the PET sub-scanning areas, a plurality of PET sub-scans may be performed on the sub-scanning areas to generate PET data in step 806. For example, the sub-scans may be performed by sequentially moving the couch through the PET detectors. In some embodiments, the PET data may be reconstructed to a PET image, such as, the first PET image in step 502, or the second PET image in step 506.

In step 808, a CT image of the scanned subject may be obtained. In some embodiments, the CT image may be generated by a direct CT scan of the subject. In some embodiments, the CT image may be estimated from an MR image of the scanned subject. In some embodiments, the CT image may be obtained by registering a template CT image with a PET image of the subject to generate an estimated CT image.

An attenuation image may be obtained based on the CT image in step 810. In some embodiments, the attenuation image may be generated by performing a bilinear method on the CT image. As used herein, the bilinear method may include expressing a matter whose density is lower than water by a linear water-air model, and denoting a matter whose density is higher than water by a linear water-bone model. According to different models used for the matters, the attenuation coefficient of gamma ray in different matters may be obtained to construct a relationship between the density distribution of matter and the attenuation coefficient. In some embodiments, according to the density distribution of the matter in the CT image and the relationship between density and the attenuation coefficient, an attenuation image may be obtained. In some embodiments, an ordered subset method may be used to iteratively reconstruct the PET image based on the PET data and the attenuation image. During the iteration, a subsequent attenuation image may be updated by:

$$\bar{a}_i^{(n,m)} = e^{-\Sigma_j l_{ij} u_j^{(n,m)}}, \tag{12}$$

where n may denote the number of iteration, m may denote the number of sub-iteration in each iteration, and i may denote the sequence number of the line of response (LOR), $\bar{a}_i^{(n,m)}$ may denote the attenuation coefficient of the $i_{th}$ element in a sinogram after n times of iteration and m times of sub-iteration which is performed in the ordered subset method, e may denote the base of natural logarithms, $u_j^{(n,m)}$ may denote the value of the jth voxel after n times of iteration and m times of sub-iteration, and $l_{ij}$ may denote a line integral matrix mapping the attenuation image with the attenuation coefficient.

$$f_j^{n,m+1} = \frac{f_j^{(n,m)}}{\Sigma_{t,i\in S_m} \bar{a}_i^{(n,m)} H_{ijt}} \Sigma_{t,i\in S_m} H_{ijt} \frac{\frac{1}{\varepsilon_i}}{\Sigma_{k,t} H_{ikt} f_k^{(n,m)} + \frac{s_i+r_i}{\bar{a}_i^{(n,m)}}}, \tag{13}$$

where $f_j^{(n,m+1)}$ may denote a PET image obtained after n times of iteration and m times of sub-iteration, $S_m$ may denote the $m_{th}$ subset in data space, $H_{ijt}$ and $H_{ikt}$ may denote the transformation matrix of the sinogram, k may denote the kth voxel in the PET image, t may denote the sequence number of a time of flight box, $\varepsilon_i$ may denote a standardized coefficient on data in a list, and $s_i$ and $r_i$ may denote a number of scatter coincidence events and random coincidence events, respectively.

$$\bar{y}_i^{(n,m+1)} = \bar{a}_i^{(n,m)} \Sigma_j \cdot H_{ij} f_j^{(n,m+1)}, \tag{14}$$

where $\bar{y}_i^{(n,m+1)}$ may denote the expectation value of the $i_{th}$ voxel of the PET image after n times of iteration and m+1 times of sub-iteration.

$$\mu_j^{(n,m+1)} = \mu_j^{(n,m)} + \frac{\Sigma_{i\in S_m} l_{ij} \frac{\bar{y}_i^{(n,m+1)}}{\bar{y}_i^{(n,m+1)}+s_i+r_i} (\bar{y}_i^{(n,m+1)}+s_i+r_i-y_i) - \beta \times \frac{\partial C}{\partial \mu}(\mu,\mu_0)\Big|_{\mu=\mu^{(n,m)}}}{\Sigma_{i\in S_m} l_{ij} \frac{(\bar{y}_i^{(n,m+1)})^2}{\bar{y}_i^{(n,m+1)}+s_i+r_i} \Sigma_k l_{ik} + \beta \times \frac{\partial^2 C}{\partial \mu^2}(\mu,\mu_0)\Big|_{\mu=\mu^{(n,m)}}}, \tag{15}$$

where $\mu_j^{(n,m+1)}$ may denote an attenuation image generated from $\mu_j^{(n,m)}$ after n times of iteration and m times of sub-iteration, $l_{ik}$ may denote a line integral matrix mapping the attenuation image with the attenuation coefficient, it may also denote a length of the $i_{th}$ line of response (LOR) which crosses voxel k, $y_i$ may denote the number of annihilated photon pairs acquired from the $i_{th}$ line of response, $\beta C(\mu,\mu_0)$ may denote a new penalty function, $$\frac{\partial C}{\partial \mu}(\mu,\mu_0) \text{ and } \frac{\partial^2 C}{\partial \mu^2}(\mu,\mu_0)$$

may denote a first order derivative and a second order derivative of $\beta C(\mu,\mu_0)$ at $\mu=\mu^{(n,m)}$, and $\beta$ may denote an adjustable penalty weight. A higher $\beta$ may indicate that $\mu$ may have a higher chance to depart from an initial attenuation image $\mu_0$ corresponding to the CT image. A penalty function corresponding to formula (15) may be expressed as:

$$\text{cost} = \Sigma_i(\bar{y}_i - y_i \ln \bar{y}_i) + \beta C(\mu,\mu_0), \tag{16}$$

where "cost" may denote value of the penalty function, and $\Sigma_i(\bar{y}_i - y_i \ln \bar{y}_i)$ may denote an opposite number of a likelihood function corresponding to statistical property of data.

In some embodiments, the cost may increase with the increase of $\Sigma_i(\bar{y}_i - y_i \ln \bar{y}_i)$ and the increase of $\beta C(\mu, \mu_0)$ and may decrease when $\Sigma_i(\bar{y}_i - y_i \ln \bar{y}_i)$ and $\beta C(\mu, \mu_0)$ decrease. In some embodiments, $\beta C(\mu, \mu_0)$ may be configured to be proportional to the difference between the initial attenuation image $\mu_0$ and the attenuation image $\mu$ generated from iterations. Merely by way of example, $C(\mu,\mu_0)=|\mu-\mu_0|^2$. In some embodiments, the "cost" may be reduced when the difference between $\mu$ and $\mu_0$ is reduced.

In some embodiments, the formulae (12)-(15) may be applied repeatedly to update the PET image and the attenuation image.

In some embodiments, one method of iterative reconstruction may include iteratively updating a PET image based on formula (13) while keeping the attenuation image unchanged. In some embodiments, one method of iterative reconstruction may include iteratively updating the attenuation image based on formula (15) while keeping the PET image unchanged. An iteration may be terminated when all ordered subsets in the previous iteration have been gone through. In some embodiments, the iterative reconstruction may terminate when a termination condition is satisfied to generate a final PET image and a final attenuation image. If the termination condition is not satisfied, the PET image and the attenuation image obtained in this iteration may be configured as the initial images of next iteration and the iterative reconstruction process may repeat till the termination condition is satisfied.

In some embodiments, by reconstructing the PET image and the attenuation image using an iterative method according to formulae (12) to (15), the PET image and the attenuation image may converge to the final images faster than using a non-iterative method.

In some embodiments, the attenuation image may be updated according to:

$$\mu_j^{(n,m+1)} = \mu_j^{(n,m)} + \frac{\Sigma_i l_{ij} \frac{\bar{y}_i^{(n)}}{\bar{y}_i^{(n)}+s_i+r_i} (\bar{y}_i^{(n)}+s_i+r_i-y_i)}{\Sigma_i l_{ij} \frac{(\bar{y}_i^{(n)})^2}{\bar{y}_i^{(n)}+s_i+r_i} \Sigma_k l_{ik}}, \tag{17}$$

In some embodiments, a penalty function corresponding to formula (17) may be expressed as $$\text{cost} = \Sigma_i(\bar{y}_i - y_i \ln \bar{y}_i), \tag{18}$$

where "cost" may denote value of the penalty function, and $\Sigma_i(\bar{y}_i - y_i \ln \bar{y}_i)$ may denote an opposite number of a likelihood function corresponding to statistical property of data.

In some embodiments, formula (17) may be generated by subtracting the first order derivative and second order derivative of new penalty function $\beta C(\mu, \mu_0)$ from the numerator and the denominator of formula (15) respectively. In some embodiments, the PET image and the attenuation image based on formula (15) may converge to same final images as formula (17).

In some embodiments, PET data or CT data may be obtained by performing a plurality of sub-scanning. Furthermore, a PET image or a CT image may be reconstructed from the obtained PET data or CT data. Merely by way of example, the first data relating to the first PET image, as illustrated elsewhere in the present disclosure, may be based on a first scan. The first scan may include a plurality of first sub-scans, based on which a plurality of first sub-images may be generated. In some further embodiments, the first PET image may be generated by combining at least some of the first sub-images. Likewise, the second PET image may be generated by performing a plurality of second sub-scans. In some embodiments, sub-scanning areas may be generated based on the size and shape of the scanning area. In some embodiments, the sub-scanning areas may be combined to cover the scanning area. In some embodiments, the numbers of sub-scanning areas may be determined by the axial length of the scanning area and the width of acquisition of the PET detector in axial direction. In some embodiments, a method for determining the scanning area may include: configuring a box representing the scanning area on the preliminary image; changing the size and shape of the box according to the area of interest; configuring the final box as the scanning area of the subject. For instance, the box may have a shape of a rectangle, a square, a parallelogram, a triangle, a trapezoid, a pentagon, a hexagon, etc. In some embodiments, the shape and size of the box may be changed by dragging at least one of the corners of the box. In some embodiments, the shape and size of the box may be changed by dragging at least one of the sides of the box. Details regarding obtaining a CT image from an MR image can be found in Chinese Application 201410669318.9, the contents of which are hereby incorporated by reference.

Figure 9A:
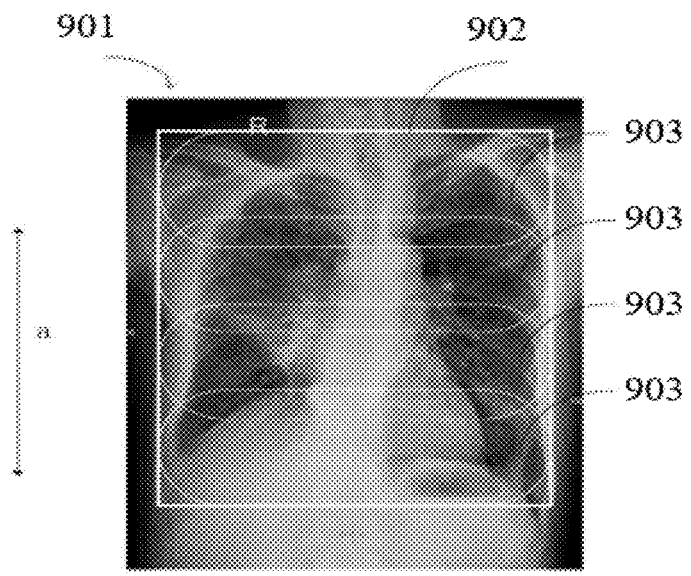
FIG. 9A illustrates a schematic diagram of a preliminary image illustrating a process for generating PET sub-scanning areas according to some embodiments of the present disclosure.

FIG. 9A is a schematic diagram of a preliminary image illustrating a process of generating PET sub-scanning areas according to some embodiments of the present disclosure. As shown in FIG. 9A, image 901 may be generated by a PET scan of a coronal section or a sagittal section (also referred to as coronal scan and sagittal scan respectively). Direction a (vertical direction in FIG. 9A) may be an axial direction of the preliminary image. In some embodiments, the axial direction may be along the long axis of the scanned subject. In some embodiments, the axial direction may be the longitudinal direction of a human body. Initially, a sub-scanning area 902 may be determined based on the preliminary image 901. Then, a plurality of sub-scanning areas 903 may be determined. In some embodiments, the sub-scanning areas 903 may be arranged along with direction a (also referred to as the axial direction). In some embodiments, a sub-scanning area may correlate with the width of a PET detector. In some embodiments, all sub-scanning areas may have same or similar size and shapes. In some embodiments, the sub-scanning areas may be arranged so that a least one of the sub-scanning areas may overlap with one side (e.g., the upper boundary in FIG. 9A) of the scanning area, and at least one of the sub-scanning areas may overlap with one opposite side (e.g., the lower boundary) of the scanning area. After the sub-scanning areas at two opposite sides of the scanning area is configured, the remaining scanning area may be divided equally depending on the width of acquisition of the PET detectors. In some embodiments, adjacent sub-scanning areas 903 may overlap with each other. In some embodiments, sub-scanning areas 903, when combined, may cover the scanning area 902.

In some embodiments, a method of generating sub-scanning areas 903 based on the scanning area 902 may include: determining the number of sub-scanning areas needed to cover the scanning area according to the axial length of the sub-scanning areas (also referred to as the width of acquisition of PET detector) and the axial length of overlapping areas between sub-scanning areas; determining the actual axial length of overlapping areas based on the determined number of sub-scanning areas; and adjusting the axial length of overlapping areas as needed. If the axial length of overlapping areas cannot be greater than the value as needed after every possible adjustment, the number of sub-scanning areas may be increased. Merely by way of example, the axial length of a scanning area is 1.2 meters, the axial length of PET sub-scanning areas is 0.4 meters, and the minimum axial length of the overlapping areas is 8 centimeters. At first, the smallest number of sub-scanning areas may be determined as four and the axial length of overlapping areas may be calculated as 13.3 centimeters. A judgment may then be performed to check whether 13.3 centimeters is greater than the minimum axial length, which is 8 centimeters. As 13.3 centimeters is actually greater than 8 centimeters, one of the possible arrangement of the axial length of the overlapping areas between four sub-scanning areas may be 13.3 centimeters, 13.3 centimeters and 13.3 centimeters. However, if the areas of interest according to some embodiments of the present disclosure are configured to have a particular axial ranges, the arrangement of the axial length of the overlapping areas between four sub-scanning areas may be 8 centimeters, 24 centimeters, and 8 centimeters.

This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. It should be appreciated for those skilled in the art that any arrangement of the axial length of overlapping areas between sub-scanning areas may be reasonable as long as the axial length is greater than the minimum requirement.

Figure 9B:
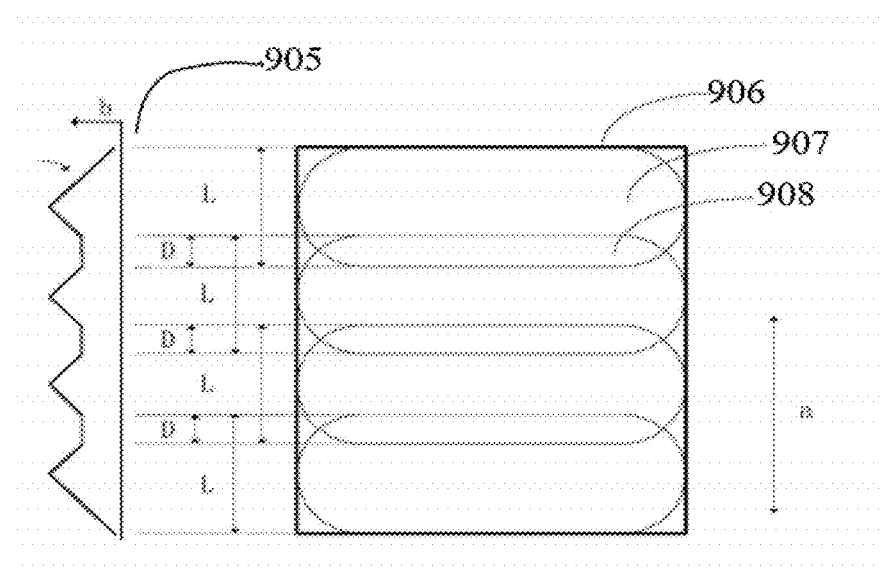
FIG. 9B illustrates a schematic diagram illustrating a process for generating sub-scanning areas according to some embodiments of the present disclosure.

FIG. 9B is a schematic diagram illustrating a process of generating sub-scanning areas. Similar to FIG. 9A, area 906 may be a scanning area, area 907 may be a sub-scanning area, and area 908 may be an overlapping area between two sub-scanning areas. The axial length of the sub-scanning area 903 may be L, the axial length of the overlapping area 908 may be D, and the line graph 905 may represent an image quality at different axial values, where direction b may represent an increase of the image quality.

In some embodiments, for each of the sub-scanning areas 903, central sections may correspond to highest image quality as shown in the line graph 905. In some embodiments, the axial length of the overlapping area D may be 0.15 to 0.5 times of the axial length of the sub-scanning area L. It can be seen that the image quality at the edge of each sub-scanning area is enhanced due to the overlapping of neighboring sub-scanning areas.

In some embodiments, there may be a plurality of areas of interest in the scanning area, which may need to have a high image quality. In some embodiments, the scanning area 902 may be moved along the axial direction to ensure the important areas are inside or approaching an area with high image quality. For example, important areas may be arranged at a central section of a sub-scanning area. As another example, the image quality of an area of interest may be enhanced by overlapping two or more sub-scanning areas. Details regarding obtaining a plurality of sub-images can be found in Chinese Application 201410182257.3, the contents of which are hereby incorporated by reference.

The sub-images of the sub-scanning areas may be combined to form an image of the area of interest. The method for combining the sub-images may be found in, for example, U.S. application Ser. No. 15/225,915, entitled "SYSTEM AND METHOD FOR IMAGE RECONSTRUCTION," filed on even date, the entire contents of which are hereby incorporated by reference.

Figure 10:
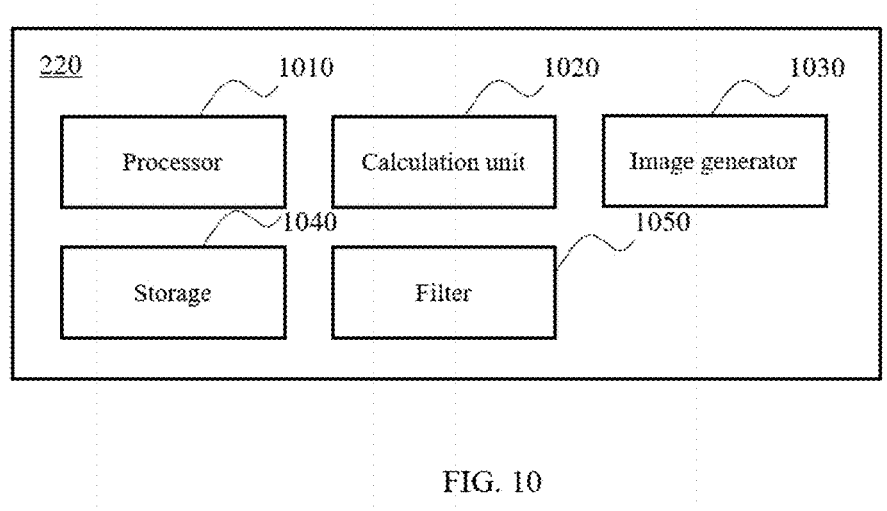
FIG. 10 illustrates a block diagram of a data processing module 220 according to some embodiments of the present disclosure.

FIG. 10 is a block diagram of a data processing module 220 according to some embodiments of the present disclosure. As illustrated in FIG. 10, the data processing module 220 may include a processor 1010, a calculation unit 1020, an image generator 1030, a storage 1040, and a filter 1050.

The processor 1010 may process the data transmitted from the data acquisition module 210, or retrieved from a storage medium. In some embodiments, the processed data may be CT data, MR data, PET data, or any combination thereof. In some embodiments, the processor 1010 may process a CT data or MR data to generate an attenuation image, which may be stored in the storage 1040 or transmitted to the calculation unit 1020.

The calculation unit 1020 may be configured to perform calculations on data (e.g., emission data in a PET/CT system) or images (e.g., an attenuation image). In some embodiments, the calculation unit 1020 may perform forward-projection on an attenuation image to obtain an attenuation sinogram.

The image generator 1030 may be configured to generate images based on data processed by the processor 1010 or the calculation unit 1020. In some embodiments, the image generator 1030 may generate an initial image (e.g., the first PET image Img1 in step 502). In some embodiments, the image generator may be configured to generate an attenuation sinogram that is a four-dimensional image with attenuation data (e.g. attenuation values of gamma ray) on it. In some embodiments, the attenuation sinogram may be generated by forward-projecting an attenuation image. In some embodiments, the image generator 1030 may generate an image by combining a plurality of sub-images as illustrated in FIG. 9 and the description thereof.

The storage 1040 may be configured to store the data that transmitted by the calculation unit 1020, the processor 1010, the calculation unit 1020, the image generator 1030, and/or other storage medium, such as, the storage module 240 of the system, etc. Merely by way of example, the storage 1040 may acquire CT and/or MR data from the data acquisition module 210, and transmit the acquired data to the processor 1010. As another example, the storage 1040 may acquire the attenuation image from the processor 1010 and transmit it to the calculation unit 1020.

The filter 1050 may be configured to filter the emission sinogram generated by the calculation unit 1020. In some embodiments, the filter 1050 may filter the LORs of the emission sinogram with a contour filter that may represent a contour of the subject to be scanned. For example, a LOR locating outside of region of interest may not be processed during the image reconstruction process. In some embodiments, the filtered emission sinogram may be transmitted to the image processing module 230, in which the image reconstruction may take place.

Figure 11:
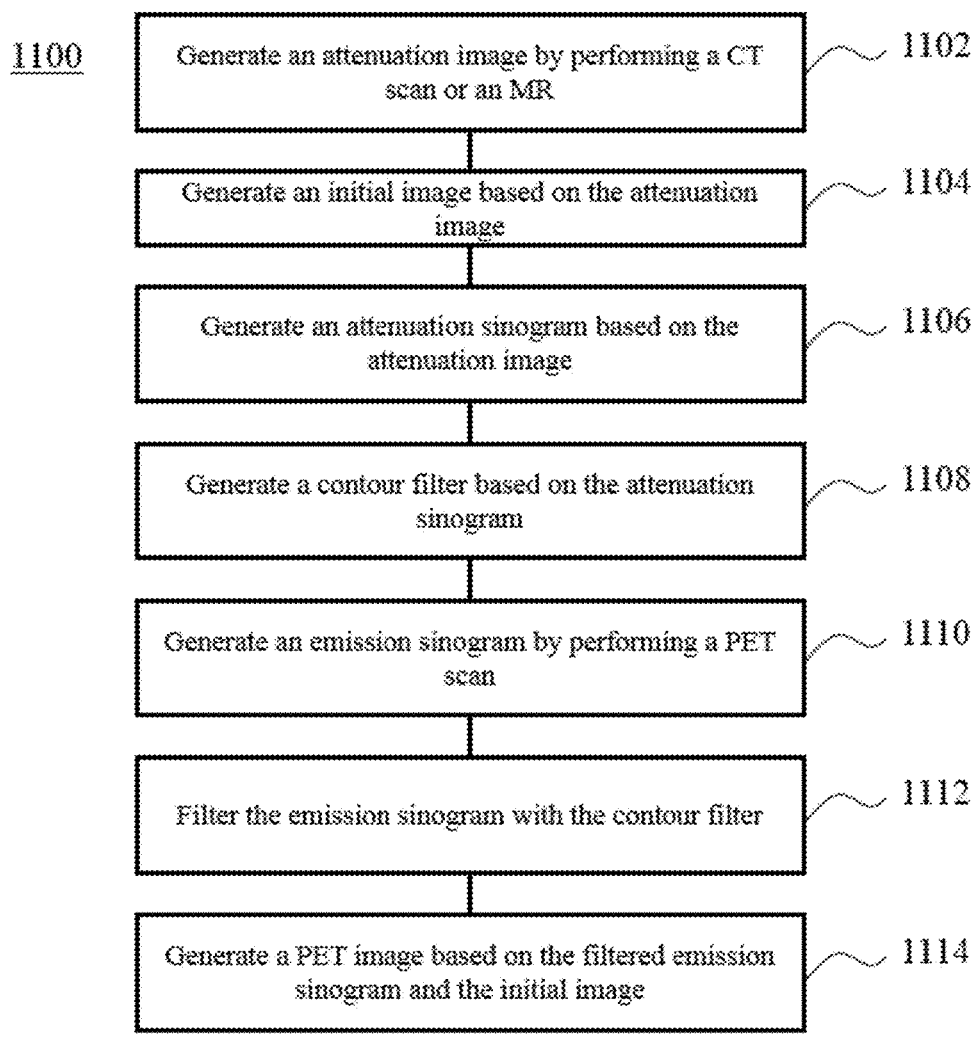
FIG. 11 illustrates a flowchart illustrating a data processing method according to some embodiments of the present disclosure.

FIG. 11 is a flowchart illustrating a data processing method according to some embodiments of the present disclosure.

In step 1102, an attenuation image may be generated by performing a CT scan or an MR scan. In some embodiments, the attenuation image may be generated by back projecting a sinogram by, for example, a filtered back projection algorithm. The values of the pixels in the attenuation image, which may also be referred as CT values or attenuation values, may represent radiation (e.g., X-ray) attenuation corresponding to different parts of the subject being scanned.

In step 1104, an initial image may be generated based on the attenuation image generated in step 1102. The initial image of the subject may correspond to an emission sinogram relating to a PET scan. In some embodiments, since the field of view (FOV) of a CT scanner or an MR scanner may be smaller than the FOV of a PET scanner, the initial image may be generated by extending the attenuation image of CT or MR spatially to fit the size of a PET image, and thus the initial image may fit an emission sinogram relating to a CT scan and/or MR scan. In some embodiments, the initial image may include the attenuation value of gamma ray (e.g., as needed in a PET system) converted from the attenuation value of X-ray (e.g., as needed in a CT/MR system) included in the attenuation image.

In step 1106, an attenuation sinogram may be generated based on the attenuation image. In some embodiments, the attenuation sinogram may be generated by performing a forward projection on the attenuation image. Merely by way of example, the attenuation image may be the first CT image illustrated elsewhere in the present disclosure, and the attenuation sinogram may be generated by forward projecting the first CT image. In some embodiments, the attenuation sinogram may be a four-dimensional image, while the attenuation image may be a three-dimensional image. Merely by way of example, the three-dimensional space of the attenuation image may be an x-y-z space, where z is the rotation axis of the detectors, x is the horizontal direction and y is the vertical direction. The four-dimensional space of the attenuation sinogram may be an s-φ-z-θ space. To better understand the four-dimensional space, imagine an LOR L' detected by two detector cells $d_a$ and $d_b$, s may represent the distance between O and projection of L' on x-y plane, where O is the origin or circle center of the detector ring, φ may represent the angle between L' and the positive y axis, θ may represent the angle between L' and the x-y plane.

In step 1108, a contour filter may be generated based on the attenuation sinogram generated in step 1106. In some embodiments, the attenuation sinogram may include one or more attenuation values, and the attenuation values that are no less than a threshold may be collected to determine an outline of the subject. Furthermore, the contour filter may be determined based on the outline of the subject. In some embodiments, the threshold may be set by an operator, such as, a doctor, an imaging technician, an engineer, etc. In some embodiments, the threshold may be a default setting of the system that may be retrieved from a storage medium of the system or accessible from the system.

It shall be noted that those skilled in the art may realize that different organs and tissues of the subject may have different attenuation capacities due to their different capacities to absorb radiation (e.g., X-ray). A tissue with a higher density may absorb more radiation (e.g., X-rays) than a tissue with a lower density. For example, a bone may absorb more X-rays than a lung or another soft tissue including, for example, ligaments, muscle, cartilage, tendons, etc. Thus, an attenuation threshold set to determine a contour of the subject (or the contour filter) on the attenuation sinogram may correspond to the specific tissue being scanned. In some embodiments, the attenuation threshold may range between that of air and water.

After the attenuation threshold is set, the contour filter may be determined based on the attenuation sinogram. For instance, if the scanner scans the subject from the external part of FOV to the central FOV, i.e., along the s axis, the attenuation values of the external part of FOV may be less than the attenuation threshold due to the fact that most part of the external FOV may be air. Merely by way of example, the contour filter may be determined based on the attenuation sinogram generated by, for example, forward projecting the first CT image.

In step 1110, an emission sinogram may be generated based on PET data obtained by performing a PET scan. In some embodiments, the emission data, such as a LOR, may be the emission sinogram with reference to the s coordinates and φ coordinate of the detected LORs. In some embodiments, the emission data may be the first data related to the first PET image illustrated elsewhere in the present disclosure.

In step 1112, the emission sinogram generated in step 1110 may be filtered by the contour filter. The emission data within the scope of the contour filter may be acquired from the emission data recorded on the emission sinogram. In some embodiments, the acquired emission data may include the LORs corresponding to events which may denote the detection of two photons emitted from an annihilated point. Merely by way of example, the emission data may be the first data related to the first PET image Img1 illustrated elsewhere in the present disclosure. The first data may be filtered by the contour filter to obtain a filtered first data. Details regarding filtering by a contour filter can be found in Chinese Application 201310004470.0, the contents of which are hereby incorporated by reference.

It should be noted here that both the attenuation sinogram and the emission sinogram may be four-dimensional. In some embodiments, the detectors in the CT or MR system are arranged in the same way as in a PET system, such that the points in the attenuation sinogram and the emission sinogram may correspond to each other rigidly. As a result, the contour filter of the attenuation sinogram may be used to filter the LORs on the emission sinogram.

In step 1114, a PET image may be generated based on the filtered emission sinogram and the initial image. In some embodiments, the PET image may be reconstructed based on the emission data filtered out by the contour filter. Merely by way of example, the PET image generated in step 1114 may be the first PET image illustrated elsewhere in the present disclosure. The first PET image may be generated based on the filtered first data.

EXAMPLES

The following examples are provided for illustration purposes, and not intended to limit the scope of the present disclosure.

Example 1

Figure 12A:
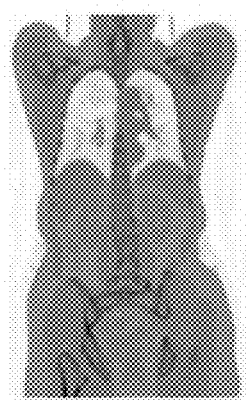
FIG. 12A and FIG. 12B illustrate an exemplary CT image and a corresponding PET image, respectively, according to some embodiments of the present disclosure.
Figure 12B:
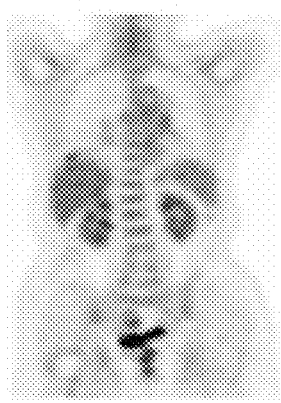
Figure 12C:
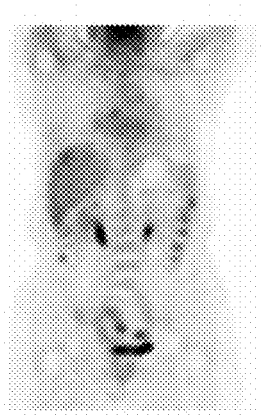
FIG. 12C illustrates an exemplary CT image calibrated by the motion field determined by two PET images according to some embodiments of the present disclosure.
Figure 12D:
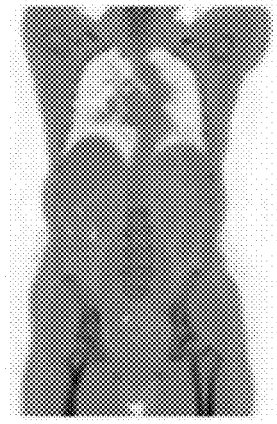
FIG. 12D and FIG. 12E illustrate an exemplary PET image and a calibrated PET image thereof according to some embodiments of the present disclosure.
Figure 12E:
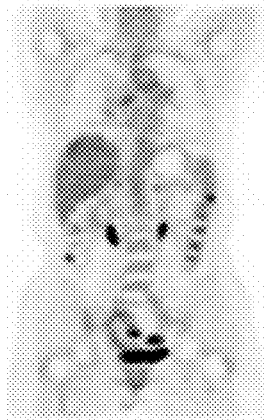
Figure 12F:
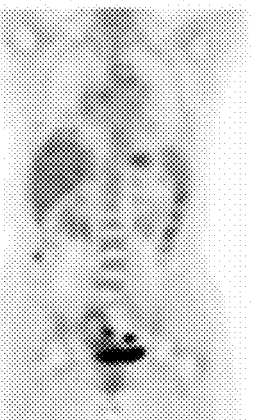
FIG. 12F illustrates an exemplary motion-filed calibrated PET image based on the PET image illustrated in FIG. 12B according to some embodiments of the present disclosure.

FIG. 12A illustrates an exemplary first CT image, FIG. 12B illustrates an exemplary first PET image corresponding to the first CT image according to some embodiments of the present disclosure. In some embodiments, the first CT image and first PET image was generated by performing a PET-CT scan. FIG. 12C illustrates an exemplary second CT image calibrated by the motion field determined by the first PET image and the second PET image. FIG. 12D illustrates an exemplary second PET image that was obtained based on a second PET scan performed at a different time compared to the first PET scan. FIG. 12E illustrates an exemplary calibrated second PET image. The calibrated second PET image was obtained according to the procedure illustrated in FIG. 5 and the description thereof. FIG. 12F illustrates an exemplary motion-filed calibrated PET image that was obtained by way of calibration of the first PET image. The calibration was based on the motion field between FIG. 12B and FIG. 12D. Referring to FIG. 12E and FIG. 12B, the two images have essentially the same quality. The results may suggest that a PET image with essentially the same quality may be generated by way of calibration with a second CT image when the second CT image is generated based on the motion-filed calibrated first CT image as described in the present disclosure, compared with when the second CT image is acquired by a conventional CT scan. The images in FIG. 12E and FIG. 12F were both calibrated with respect to the motion field.

Example 2

FIG. 13A-FIG. 13F illustrate an exemplary registration result between PET images according to some embodiments of the present disclosure. FIG. 13A illustrates a PET image reconstructed from data acquired at a first time point without attenuation correction. FIG. 13B illustrates a PET image reconstructed from data acquired at a second time point without attenuation correction. FIG. 13C illustrates an attenuation image based on CT data acquired at the first time point. FIG. 13D illustrates an estimated attenuation image corresponding to the second time point acquired by the methods described according to some embodiments of the present disclosure. FIG. 13E illustrates a differential image between the estimated attenuation image and an actual attenuation image from data acquired at the second time point. FIG. 13F illustrates a differential image between another estimated attenuation image according to a traditional method and the actual attenuation image. It can be seen from FIG. 13E that, compared to FIG. 13F, a smaller difference from the actual attenuation image was achieved by the method described in the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method for image calibration, the method comprising:
obtaining a first positron emission tomography (PET) image based on first PET data relating to a subject, wherein the first PET data is generated at a first time using a PET imaging unit;
obtaining an initial second PET image based on second PET data relating to the subject, wherein the second PET data is generated at a second time using the PET imaging unit;
obtaining a third image of the subject based on third data, wherein the third data is generated using a second imaging unit, the third image including a computed tomography (CT) image or a magnetic resonance (MR) image, the second imaging unit including a CT imaging unit or an MR imaging unit, the third image corresponding to the first PET image;

during each of one or more iterations, registering the first PET image and a second PET image to obtain a motion field relating to the first PET image and the second PET image, wherein the motion field includes displacement of pixels in the second PET image compared to corresponding pixels in the first PET image, and the second PET image is the initial second PET image or an updated second PET image from a prior iteration;
calibrating the third image based on the motion field to obtain a calibrated image relating to attenuation; and
correcting the second PET image with respect to attenuation based on the calibrated image to generate the updated second PET image; and
determining the updated second PET image obtained in the last iteration of the one or more iterations to be a corrected second PET image.

2. The method of claim 1, the correcting the second PET image with respect to attenuation based on the calibrated image to generate the updated second PET image further comprising:
obtaining an attenuation correction coefficient based on the calibrated image; and
correcting the second PET image based on the attenuation correction coefficient.

3. The method of claim 1, the first PET image comprising:
a PET image corrected for attenuation correction based on the third image.

4. The method of claim 1, the registering the first PET image and a second PET image comprising:
applying an optical flow method or mutual information maximization.

5. The method of claim 1, the obtaining an initial second PET image based on second PET data comprising:
obtaining the second PET data;
initializing an attenuation image;
sequentially updating the initial second PET image and the attenuation image based on the second PET data according to maximum likelihood expectation maximization or maximum likelihood estimation of attenuation and activity.

6. The method of claim 5, the updating the initial second PET image and the attenuation image including reconstructing the initial second PET image and the attenuation image according to ordered subset expectation maximization.

7. The method of claim 1 further comprising:
obtaining an attenuation correction coefficient based on the calibrated image obtained in the last iteration of the one or more iterations; and
further correcting the corrected second PET image based on a scatter correction coefficient relating to the attenuation correction coefficient.

8. A method for image calibration, the method comprising:
obtaining a first PET image based on first PET data relating to a subject, wherein the first PET data is generated at a first time using a PET imaging unit;
obtaining an initial second PET image based on second PET data relating to the subject, wherein the second PET data is generated at a second time using the PET imaging unit;
obtaining a third image of the subject based on third data, wherein the third data is generated using a second imaging unit, the third image including a computed tomography (CT) image or a magnetic resonance (MR) image, the second imaging unit including a CT imaging unit or an MR imaging unit, the third image corresponding to the first PET image;

during each of a plurality of iterations, obtaining the initial second PET image relating to the subject or an updated second PET image from a prior iteration;
registering the second PET image and the first PET image to obtain a motion field, wherein the motion field includes displacement of pixels in the second PET image compared to corresponding pixels in the first PET image;
calibrating the third image based on the motion field to obtain an attenuation correction coefficient;
obtaining a scatter correction coefficient based on the attenuation correction coefficient; and
generating the updated second PET image to be used in a next iteration by correcting the second PET image based on the scatter correction coefficient; and
reconstructing a corrected second PET image based on the scatter correction coefficient and the attenuation correction coefficient obtained in the last iteration of the plurality of iterations.

9. The method of claim 8, the first PET image comprising:
a PET image corrected for attenuation correction based on the third image.

10. A system for image calibration, the system comprising:
a non-transitory computer-readable storage medium storing executable instructions, and
at least one processor in communication with the computer-readable storage medium, when executing the executable instructions, causing the system to implement a method comprising:
obtaining a first PET image based on first PET data relating to a subject, an initial second PET image based on second PET data relating to the subject, and a third image of the subject based on third data, wherein the first PET data is generated at a first time, and the second PET data is generated at a second time; wherein the first PET data and the second PET data are generated using a PET imaging unit, and the third data is generated using a second imaging unit, the third image including a computed tomography (CT) image or a magnetic resonance (MR) image, the second imaging unit including a CT imaging unit or an MR imaging unit, the third image corresponding to the first PET image;
during each of one or more iterations, registering the first PET image and a second PET image to obtain a motion field relating to the first PET image and the second PET image, wherein the motion field includes displacement of pixels in the second PET image compared to corresponding pixels in the first PET image, and the second PET image is the initial second PET image or an updated second PET image from a prior iteration;
calibrating the third image based on the motion field to obtain a calibrated image relating to attenuation; and
correcting the second PET image with respect to attenuation based on the calibrated image to generate the updated second PET image; and
determining the updated second PET image obtained in the last iteration of the one or more iterations to be a corrected second PET image.

11. The system of claim 10, the correcting the second PET image with respect to attenuation based on the calibrated image to generate the updated second PET image further comprising:
obtaining an attenuation correction coefficient based on the calibrated image; and
correcting the second PET image based on the attenuation correction coefficient.

12. The system of claim 10, the first PET image comprising:
a PET image corrected for attenuation correction based on the third image.

13. The system of claim 10, wherein the system is caused to implement the method further including:
obtaining the second PET data;
initializing an attenuation image; and
sequentially updating the initial second PET image and the attenuation image based on the second PET data according to maximum likelihood expectation maximization or maximum likelihood estimation of attenuation and activity.

14. The system of claim 13, wherein the updating the initial second PET image and the attenuation image includes reconstructing the initial second PET image and the attenuation image according to ordered subset expectation maximization.

15. The system of claim 10, wherein the system is caused to implement the method further comprising:
generating the first PET image by combining a plurality of sub-images, wherein the plurality of sub-images are generated by performing a plurality of sub-scans on the subject.

* * * * *